United States Patent
Eisenberger et al.

(10) Patent No.: US 12,533,623 B2
(45) Date of Patent: Jan. 27, 2026

(54) CONTINUOUS-MOTION DIRECT AIR CAPTURE SYSTEM

(71) Applicant: Global Thermostat Operations, LLC, Brighton, CO (US)

(72) Inventors: Peter Eisenberger, New York, NY (US); Eric W. Ping, Thornton, CO (US); Miles Sakwa-Novak, Atlanta, GA (US); Jed Pruett, Arvada, CO (US); Robert Klepper, Arvada, CO (US); Sarah Wyper, Denver, CO (US)

(73) Assignee: Global Thermostat Operations, LLC, Brighton, CO (US)

( * ) Notice: Subject to any disclaimer, the term of this patent is extended or adjusted under 35 U.S.C. 154(b) by 401 days.

(21) Appl. No.: 18/001,124

(22) PCT Filed: Jun. 9, 2021

(86) PCT No.: PCT/US2021/036696
§ 371 (c)(1),
(2) Date: Dec. 8, 2022

(87) PCT Pub. No.: WO2021/252695
PCT Pub. Date: Dec. 16, 2021

(65) Prior Publication Data
US 2023/0211278 A1    Jul. 6, 2023

Related U.S. Application Data

(60) Provisional application No. 62/705,061, filed on Jun. 9, 2020.

(51) Int. Cl.
*B01D 53/04* (2006.01)
*B01D 53/00* (2006.01)
(Continued)

(52) U.S. Cl.
CPC ....... *B01D 53/0446* (2013.01); *B01D 53/005* (2013.01); *B01D 53/0431* (2013.01);
(Continued)

(58) Field of Classification Search
CPC .. B01D 53/0446; B01D 53/04; B01D 53/005; B01D 53/0431; B01D 53/06;
(Continued)

(56) References Cited

U.S. PATENT DOCUMENTS 3,907,310 A * 9/1975 Dufour ................. F28D 19/047
165/9
5,169,414 A * 12/1992 Panzica ................. F24F 3/1423
96/125
(Continued)

FOREIGN PATENT DOCUMENTS

AU    2013200405 B2    8/2017
CA    2510235 A1    7/2004
(Continued)

OTHER PUBLICATIONS

International Search Report, PCT/US2021/036696, mailed Sep. 15, 2021.
(Continued)

*Primary Examiner* — Frank M Lawrence, Jr.
(74) *Attorney, Agent, or Firm* — Wolf, Greenfield & Sacks, P.C.

(57) ABSTRACT

A system and a method for continuously separating carbon dioxide from gas mixtures, utilizing a continuous loop of porous monoliths which support a sorbent within its pores. Continuously exposing a portion of the continuous loop of monoliths to a flow of gas mixture containing a minor proportion of carbon dioxide, to adsorb carbon dioxide from the flow. The loop passes through a sealed regeneration and carbon dioxide capture assembly located astride a portion of
(Continued)

the loop, and which is capable of sealingly containing a monolith in relative movement through the assembly. The assembly chamber comprises a plurality of separately sealed zones, including at least one zone for purging oxygen from the monoliths, —a subsequent zone for heating the monolith to release the adsorbed carbon dioxide, and another cooling zone for cooling the monolith prior to reentering the adsorption portion of the loop where it is exposed to oxygen.

19 Claims, 12 Drawing Sheets

(51) Int. Cl.
| | |
|---|---|
| *B01D 53/06* | (2006.01) |
| *B01J 20/28* | (2006.01) |
| *B01J 20/32* | (2006.01) |
| *B01J 20/34* | (2006.01) |
| *C01B 32/50* | (2017.01) |
| *C01B 32/55* | (2017.01) |

(52) U.S. Cl.
CPC ........ *B01D 53/06* (2013.01); *B01J 20/28042* (2013.01); *B01J 20/3466* (2013.01); *C01B 32/55* (2017.08); B01D 2253/342 (2013.01); B01D 2256/10 (2013.01); B01D 2256/12 (2013.01); B01D 2257/504 (2013.01); B01D 2258/06 (2013.01); B01D 2259/40088 (2013.01)

(58) Field of Classification Search
CPC .......... B01D 2253/342; B01D 2256/10; B01D 2256/12; B01D 2257/504; B01D 2258/06; B01D 2259/40088; B01D 2253/25; B01D 2258/0283; B01D 2259/4009; B01D 53/02; B01J 20/28042; B01J 20/3466; C01B 32/55; C01B 32/50; Y02C 20/40; Y02P 20/151
USPC .... 96/123, 125, 143–145, 150; 95/107, 113, 95/139; 423/230
See application file for complete search history.

(56) References Cited

U.S. PATENT DOCUMENTS

| | | | |
|---|---|---|---|
| 5,367,147 A | 11/1994 | Kim et al. | |
| 5,376,614 A | 12/1994 | Birbara et al. | |
| 5,716,899 A | 2/1998 | Guile et al. | |
| 5,876,488 A | 3/1999 | Birbara et al. | |
| 6,364,938 B1 | 4/2002 | Birbara et al. | |
| 6,409,801 B1 | 6/2002 | Shen et al. | |
| 6,527,837 B2* | 3/2003 | Kurosawa | F24F 3/1423 55/502 |
| 7,018,447 B2* | 3/2006 | McAnespie | B01D 53/06 95/143 |
| 7,198,768 B2 | 4/2007 | Carre et al. | |
| 7,527,677 B2 | 5/2009 | Saito et al. | |
| 7,559,993 B1 | 7/2009 | Patel et al. | |
| 7,767,004 B2 | 8/2010 | Sayari et al. | |
| 8,119,091 B2 | 2/2012 | Keith et al. | |
| 8,435,330 B2 | 5/2013 | Bade et al. | |
| 8,496,734 B2 | 7/2013 | Gadkaree et al. | |
| 8,500,855 B2 | 8/2013 | Eisenberger | |
| 8,500,857 B2 | 8/2013 | Eisenberger | |
| 8,500,859 B2 | 8/2013 | Eisenberger | |
| 8,500,860 B2 | 8/2013 | Eisenberger | |
| 8,519,012 B2 | 8/2013 | O'Connor | |
| 8,557,027 B2 | 10/2013 | Peiffer et al. | |
| 8,598,071 B1 | 12/2013 | Baugh et al. | |
| 8,690,992 B2 | 4/2014 | Dube et al. | |
| 8,696,801 B2 | 4/2014 | Eisenberger | |
| 8,850,861 B2 | 10/2014 | Friedrichs | |
| 8,852,328 B2* | 10/2014 | Barclay | C07C 7/12 165/88 |
| 8,871,008 B2 | 10/2014 | Henderson et al. | |
| 8,901,030 B2 | 12/2014 | Knapp et al. | |
| 8,974,576 B2 | 3/2015 | Gupta et al. | |
| 8,974,577 B2 | 3/2015 | Jiang et al. | |
| 9,011,583 B2 | 4/2015 | Halder et al. | |
| 9,028,592 B2 | 5/2015 | Eisenberger | |
| 9,034,787 B2 | 5/2015 | Boek et al. | |
| 9,061,237 B2 | 6/2015 | Eisenberger et al. | |
| 9,062,586 B2 | 6/2015 | Jiang et al. | |
| 9,073,000 B2 | 7/2015 | Halder et al. | |
| 9,138,676 B2 | 9/2015 | Halder et al. | |
| 9,169,369 B2 | 10/2015 | Peiffer et al. | |
| 9,169,370 B2 | 10/2015 | Peiffer et al. | |
| 9,175,591 B2 | 11/2015 | Hamad | |
| 9,205,365 B2 | 12/2015 | Jiang et al. | |
| 9,227,153 B2 | 1/2016 | Eisenberger | |
| 9,272,242 B2 | 3/2016 | Kortunov et al. | |
| 9,333,484 B2 | 5/2016 | Calabro et al. | |
| 9,427,726 B2 | 8/2016 | Chaikittisilp et al. | |
| 9,433,896 B2 | 9/2016 | Eisenberger | |
| 9,457,340 B2 | 10/2016 | Buelow et al. | |
| 9,477,788 B2 | 10/2016 | Halder et al. | |
| 9,527,029 B2 | 12/2016 | Elliott et al. | |
| 9,550,142 B2 | 1/2017 | Roestenberg et al. | |
| 9,555,365 B2 | 1/2017 | Eisenberger et al. | |
| 9,581,062 B2 | 2/2017 | Hamad et al. | |
| 9,610,533 B2 | 4/2017 | Peiffer et al. | |
| 9,610,561 B2 | 4/2017 | Addiego et al. | |
| 9,616,378 B2 | 4/2017 | Eisenberger | |
| 9,630,143 B2 | 4/2017 | Eisenberger et al. | |
| 9,878,286 B2 | 1/2018 | Eisenberger | |
| 9,908,080 B2 | 3/2018 | Eisenberger et al. | |
| 9,925,488 B2 | 3/2018 | Eisenberger | |
| 9,937,461 B2 | 4/2018 | Eisenberger et al. | |
| 9,969,665 B2 | 5/2018 | O'Connor et al. | |
| 9,975,087 B2 | 5/2018 | Eisenberger | |
| 10,010,861 B2 | 7/2018 | Choi et al. | |
| 10,125,641 B2 | 11/2018 | Sundaram et al. | |
| 10,152,880 B2 | 12/2018 | Wu | |
| 10,179,839 B2 | 1/2019 | Falkowski et al. | |
| 10,188,975 B2 | 1/2019 | Fu et al. | |
| 10,232,305 B2 | 3/2019 | Gebald et al. | |
| 10,239,017 B2 | 3/2019 | Eisenberger | |
| 10,279,306 B2 | 5/2019 | Gebald et al. | |
| 10,413,866 B2 | 9/2019 | Eisenberger | |
| 10,421,913 B2 | 9/2019 | Von Olshausen et al. | |
| 10,449,479 B2 | 10/2019 | Sundaram et al. | |
| 10,654,025 B2 | 5/2020 | Choi et al. | |
| 10,814,288 B2 | 10/2020 | Sundaram et al. | |
| 10,858,302 B2 | 12/2020 | Chen et al. | |
| 11,014,810 B1 | 5/2021 | De Wit et al. | |
| 11,059,024 B2 | 7/2021 | Khunsupat et al. | |
| 11,083,989 B2 | 8/2021 | Jakobsson et al. | |
| 11,193,421 B2 | 12/2021 | Younes et al. | |
| 11,420,149 B2 | 8/2022 | Gebald et al. | |
| 11,420,182 B2 | 8/2022 | Bai et al. | |
| 11,446,605 B2 | 9/2022 | Besarati et al. | |
| 11,446,634 B2 | 9/2022 | Pang et al. | |
| 11,511,992 B2 | 11/2022 | O'Neal et al. | |
| 11,571,658 B2 | 2/2023 | Younes et al. | |
| 11,617,981 B1 | 4/2023 | Younes et al. | |
| 11,623,863 B2 | 4/2023 | Mccahill et al. | |
| 11,628,401 B2 | 4/2023 | Beall et al. | |
| 11,654,393 B2 | 5/2023 | Besarati et al. | |
| 11,685,658 B2 | 6/2023 | Gilroysmith et al. | |
| 11,738,301 B2 | 8/2023 | Holman et al. | |
| 11,766,636 B1 | 9/2023 | Besarati et al. | |
| 11,794,164 B2 | 10/2023 | Pang et al. | |
| 11,850,570 B2 | 12/2023 | Khunsupat et al. | |
| 11,944,932 B2* | 4/2024 | Suter | B01D 53/0438 |
| 12,172,123 B2* | 12/2024 | Eisenberger | B01D 53/62 |
| 2001/0009124 A1 | 7/2001 | Suzuki et al. | |
| 2005/0255021 A1 | 11/2005 | Difrancesco et al. | |
| 2006/0051274 A1 | 3/2006 | Wright et al. | |
| 2008/0264254 A1 | 10/2008 | Song et al. | |
| 2008/0289495 A1 | 11/2008 | Eisenberger et al. | |

(56) References Cited

U.S. PATENT DOCUMENTS

| | | |
|---|---|---|
| 2008/0293976 A1 | 11/2008 | Olah et al. |
| 2009/0308555 A1 | 12/2009 | Klaus et al. |
| 2010/0222489 A1 | 9/2010 | Jiang et al. |
| 2010/0254883 A1 | 10/2010 | Eisenberger et al. |
| 2010/0284877 A1 | 11/2010 | Defrancescol et al. |
| 2010/0288704 A1 | 11/2010 | Amsden |
| 2010/0319537 A1 | 12/2010 | Eisenberger et al. |
| 2011/0081710 A1 | 4/2011 | Wright et al. |
| 2012/0000364 A1 | 1/2012 | Eisenberger et al. |
| 2012/0152116 A1* | 6/2012 | Barclay ............... B01D 53/06 96/144 |
| 2012/0167764 A1 | 7/2012 | Eisenberger |
| 2012/0216676 A1 | 8/2012 | Addiego et al. |
| 2012/0252659 A1 | 10/2012 | Difrancesco |
| 2013/0207034 A1 | 8/2013 | Addiego |
| 2013/0255267 A1 | 10/2013 | Elkady et al. |
| 2014/0010719 A1 | 1/2014 | Eisenberger |
| 2014/0105800 A1 | 4/2014 | Zeijlstra et al. |
| 2014/0130670 A1 | 5/2014 | Eisenberger et al. |
| 2014/0145110 A1 | 5/2014 | Eisenberger et al. |
| 2014/0175336 A1 | 6/2014 | Gupta et al. |
| 2014/0298996 A1 | 10/2014 | Meirav et al. |
| 2015/0000772 A1 | 1/2015 | Onodera |
| 2015/0017706 A1 | 1/2015 | Kainth et al. |
| 2015/0079335 A1 | 3/2015 | Trefzger et al. |
| 2015/0209726 A1 | 7/2015 | Difrancesco et al. |
| 2015/0273385 A1* | 10/2015 | Eisenberger ........... B01D 53/08 95/107 |
| 2015/0299054 A1 | 10/2015 | Ogunwumi et al. |
| 2015/0313401 A1 | 11/2015 | Chichilnisky |
| 2015/0314235 A1 | 11/2015 | Kortunov et al. |
| 2015/0329369 A1 | 11/2015 | Heidel |
| 2016/0158691 A1 | 6/2016 | Kortunov et al. |
| 2016/0199810 A1 | 7/2016 | Goeppert et al. |
| 2016/0367964 A1 | 12/2016 | Chaikittisilp et al. |
| 2017/0113182 A1 | 4/2017 | Voskian et al. |
| 2017/0271701 A1 | 9/2017 | Berlowitz et al. |
| 2017/0321656 A1 | 11/2017 | Eisenberger et al. |
| 2018/0028962 A1 | 2/2018 | Hatton et al. |
| 2018/0296961 A1 | 10/2018 | Jiang et al. |
| 2018/0361352 A1 | 12/2018 | Gross et al. |
| 2019/0022573 A1 | 1/2019 | Weston |
| 2019/0099711 A1 | 4/2019 | Hatton et al. |
| 2020/0009504 A1 | 1/2020 | Eisenberger |
| 2020/0011298 A1 | 1/2020 | Eisenberger et al. |
| 2020/0047116 A1 | 2/2020 | Eisenberger |
| 2021/0060485 A1 | 3/2021 | Voskian et al. |
| 2021/0062351 A1 | 3/2021 | Voskian et al. |
| 2021/0130242 A1 | 5/2021 | Beall et al. |
| 2021/0146303 A1 | 5/2021 | Eisenberger |
| 2021/0354074 A1 | 11/2021 | Boulet |
| 2021/0380475 A1 | 12/2021 | Heidel et al. |
| 2021/0381116 A1 | 12/2021 | Kashi et al. |
| 2021/0387139 A1 | 12/2021 | Voskian et al. |
| 2022/0072470 A1 | 3/2022 | Dunn |
| 2022/0096991 A1 | 3/2022 | Jones et al. |
| 2022/0096998 A1 | 3/2022 | Heidel et al. |
| 2022/0119636 A1 | 4/2022 | Wang et al. |
| 2022/0119641 A1 | 4/2022 | Wang et al. |
| 2022/0161222 A1 | 5/2022 | Dahlgren |
| 2022/0169593 A1 | 6/2022 | Jones et al. |
| 2022/0193598 A1 | 6/2022 | Suter et al. |
| 2022/0204401 A1 | 6/2022 | Sant et al. |
| 2022/0212935 A1 | 7/2022 | Sant et al. |
| 2022/0227677 A1 | 7/2022 | Mehdipour et al. |
| 2022/0228275 A1 | 7/2022 | Sheehan |
| 2022/0233996 A1 | 7/2022 | Yeganeh et al. |
| 2022/0250002 A1 | 8/2022 | Moore et al. |
| 2022/0267914 A1 | 8/2022 | Mcginnis et al. |
| 2022/0290860 A1 | 9/2022 | Boulet |
| 2022/0331740 A1 | 10/2022 | Simonetti |
| 2022/0339575 A1 | 10/2022 | Beaumont et al. |
| 2022/0362707 A1 | 11/2022 | Kemp et al. |
| 2022/0362737 A1 | 11/2022 | Staufcik et al. |
| 2022/0372314 A1 | 11/2022 | Weston et al. |
| 2022/0379257 A1 | 12/2022 | Sundaram et al. |
| 2023/0019754 A1 | 1/2023 | Sant et al. |
| 2023/0023050 A1 | 1/2023 | Eisenberger et al. |
| 2023/0036635 A1 | 2/2023 | Santos-Heard et al. |
| 2023/0058065 A1 | 2/2023 | Sant et al. |
| 2023/0060945 A1 | 3/2023 | Sheehan |
| 2023/0062545 A1 | 3/2023 | Kruger |
| 2023/0073553 A1 | 3/2023 | Holman et al. |
| 2023/0073557 A1 | 3/2023 | Kruger |
| 2023/0111280 A1 | 4/2023 | Pimpalgaonkar et al. |
| 2023/0125242 A1 | 4/2023 | Sant et al. |
| 2023/0142046 A1 | 5/2023 | Kruger |
| 2023/0149896 A1 | 5/2023 | Eisenberger et al. |
| 2023/0175146 A1 | 6/2023 | Kashi et al. |
| 2023/0202840 A1 | 6/2023 | Flanders et al. |
| 2023/0211278 A1 | 7/2023 | Eisenberger et al. |
| 2023/0241546 A1 | 8/2023 | Brouillette et al. |
| 2023/0264137 A1 | 8/2023 | De Neve et al. |
| 2023/0415092 A1 | 12/2023 | Aldridge et al. |
| 2024/0408545 A1 | 12/2024 | Elenowitz et al. |

FOREIGN PATENT DOCUMENTS

| | | |
|---|---|---|
| CN | 104624157 A | 5/2015 |
| CN | 209451571 U | 10/2019 |
| CN | 115282732 A | 11/2022 |
| EP | 2457636 A1 | 5/2012 |
| EP | 2722096 B1 | 8/2016 |
| EP | 2952244 B1 | 8/2018 |
| EP | 2959966 B1 | 9/2018 |
| EP | 3257570 B1 | 3/2019 |
| EP | 3246083 B1 | 1/2021 |
| EP | 3311904 B1 | 7/2021 |
| GB | 1283822 A | 8/1972 |
| JP | 2016-175014 A | 10/2016 |
| JP | 6498483 A | 10/2016 |
| JP | 2017-529725 A | 10/2017 |
| JP | 2020-032341 A | 2/2020 |
| KR | 102432476 B1 | 8/2022 |
| KR | 102499516 B1 | 2/2023 |
| WO | 2007045048 A1 | 4/2007 |
| WO | 2009003171 A1 | 12/2008 |
| WO | 2009126607 A2 | 10/2009 |
| WO | 2009137886 A1 | 11/2009 |
| WO | 2010022339 A2 | 2/2010 |
| WO | 2010107942 A1 | 9/2010 |
| WO | 2011019477 A1 | 2/2011 |
| WO | 2011047409 A1 | 4/2011 |
| WO | 2011077106 A1 | 6/2011 |
| WO | 2011109359 A1 | 9/2011 |
| WO | 2011/137398 A1 | 11/2011 |
| WO | 2012034003 A1 | 3/2012 |
| WO | 2012100165 A1 | 7/2012 |
| WO | 2012158194 A1 | 11/2012 |
| WO | 2013075981 A3 | 10/2013 |
| WO | 2013138437 A3 | 11/2013 |
| WO | 2013166432 A1 | 11/2013 |
| WO | 2013188641 A2 | 12/2013 |
| WO | 2014099241 A2 | 12/2013 |
| WO | 2014099268 A1 | 6/2014 |
| WO | 2014151212 A1 | 9/2014 |
| WO | 2014164738 A2 | 10/2014 |
| WO | 2014170184 A1 | 10/2014 |
| WO | 2015015157 A1 | 2/2015 |
| WO | 2015015161 A1 | 2/2015 |
| WO | 2015017240 A1 | 2/2015 |
| WO | 2015077818 A1 | 6/2015 |
| WO | 2015080998 A1 | 6/2015 |
| WO | 2015082567 A1 | 6/2015 |
| WO | 2015/103401 A1 | 7/2015 |
| WO | 2016037668 A1 | 3/2016 |
| WO | 2016191150 A1 | 12/2016 |
| WO | 2016205057 A1 | 12/2016 |
| WO | 2017009241 A1 | 1/2017 |
| WO | 2017148782 A1 | 9/2017 |
| WO | 2017184652 A1 | 10/2017 |
| WO | 2018156020 A1 | 2/2018 |
| WO | 2018064363 A1 | 4/2018 |
| WO | 2018099709 A1 | 6/2018 |

(56) References Cited

FOREIGN PATENT DOCUMENTS

| | | |
|---|---|---|
| WO | 2018175371 A1 | 9/2018 |
| WO | 2018210617 A1 | 11/2018 |
| WO | 2019079531 A1 | 4/2019 |
| WO | 2019092127 A1 | 5/2019 |
| WO | 2019092288 A1 | 5/2019 |
| WO | 2019161420 A1 | 8/2019 |
| WO | 2018112654 A1 | 10/2019 |
| WO | 2019191651 A1 | 10/2019 |
| WO | 2019204320 A1 | 10/2019 |
| WO | 2022140489 A1 | 10/2019 |
| WO | 2019229030 A1 | 12/2019 |
| WO | 2020/046864 A1 | 3/2020 |
| WO | 2020087167 A | 5/2020 |
| WO | 2020201720 A1 | 10/2020 |
| WO | 2020212146 A1 | 10/2020 |
| WO | 2020263910 A1 | 12/2020 |
| WO | 2021041732 A1 | 3/2021 |
| WO | 2021/252695 A1 | 12/2021 |
| WO | 2021239747 A1 | 12/2021 |
| WO | 2021239748 A1 | 12/2021 |
| WO | 2021239749 A1 | 12/2021 |
| WO | 2021240476 A1 | 12/2021 |
| WO | 2021252713 A1 | 12/2021 |
| WO | 2021259760 A1 | 12/2021 |
| WO | 2021260647 A1 | 12/2021 |
| WO | 20210387139 A1 | 12/2021 |
| WO | 2022020634 A1 | 1/2022 |
| WO | 2022040072 A1 | 2/2022 |
| WO | 2022096614 A1 | 5/2022 |
| WO | 2022096615 A1 | 5/2022 |
| WO | 2022103474 A1 | 5/2022 |
| WO | 2022103477 A1 | 5/2022 |
| WO | 2022104000 A1 | 5/2022 |
| WO | 2022104252 A1 | 5/2022 |
| WO | 2022115897 A1 | 6/2022 |
| WO | 2022128431 A1 | 6/2022 |
| WO | 2022152757 A1 | 7/2022 |
| WO | 2022125574 A9 | 8/2022 |
| WO | 2022178323 A1 | 8/2022 |
| WO | 2022152759 A3 | 9/2022 |
| WO | 2022179764 A1 | 9/2022 |
| WO | 2022187336 A1 | 9/2022 |
| WO | 2022195299 A1 | 9/2022 |
| WO | 2022204233 A1 | 9/2022 |
| WO | 2022192408 A3 | 10/2022 |
| WO | 2022216355 A1 | 10/2022 |
| WO | 2022232155 A1 | 11/2022 |
| WO | 2022235664 A3 | 12/2022 |
| WO | 2022238934 A3 | 12/2022 |
| WO | 2022255590 A1 | 12/2022 |
| WO | 2022255591 A1 | 12/2022 |
| WO | 2023001810 A1 | 1/2023 |
| WO | 2023278372 A1 | 1/2023 |
| WO | 2023043004 A1 | 3/2023 |
| WO | 2023043005 A1 | 3/2023 |
| WO | 2023043843 A1 | 3/2023 |
| WO | 2023065735 A1 | 4/2023 |
| WO | 2023069370 A1 | 4/2023 |
| WO | 2023069947 A2 | 4/2023 |
| WO | 2023088812 A1 | 5/2023 |
| WO | 2023089177 A1 | 5/2023 |
| WO | 2023094386 A1 | 6/2023 |
| WO | 2023096955 A1 | 6/2023 |
| WO | 2023097116 A1 | 6/2023 |
| WO | 2023104656 A1 | 6/2023 |
| WO | 2023110520 A1 | 6/2023 |
| WO | 2023196800 A1 | 10/2023 |
| WO | 2023215875 A1 | 11/2023 |
| WO | 2024006521 A2 | 1/2024 |
| WO | 2024124194 A1 | 6/2024 |
| WO | 2024133948 A1 | 6/2024 |

OTHER PUBLICATIONS

International Search Report and Written Opinion, PCT/US2020/61690, mailed Mar. 24, 2021.
China Office Action, issued by China Patent Office, CN App. 202180058344.6, mailed Apr. 15, 2024.
International Preliminary Report on Patentability, PCT/US2023/023747, issued Nov. 7, 2024.
EP Search Report, EP App. 21822313.9, mailed Oct. 28, 2024.
Sakwa-Novak, Miles A., et al, "Role of Additives in Composite PEI/Oxide CO2 Adsorbents: Enhancement in the Amine Efficiency of Supported PEI by PEG in CO2 Capture from Simulated Ambient Air," ACS Appl. Mater. Interfaces, vol. 7 (2015), pp. 24748-24759.
International Search Report, PCT/US2023/066670, mailed Feb. 5, 2024.
Schellevis, Michel, et al., "CO2 Capture From Air in a Radial Flow Contractor: Batch or Continuous Operation?" Frontiers in Chemical Engineering, vol. 2 (2020) (11 pgs.).
First Office Action, issued by Chinese Patent Office, CN Application No. 202180058344.6, mailed on Apr. 15, 2024.
Notification concerning transmittal of international preliminary report on patentability, International application No. PCT/US2023/023747, mailed Dec. 12, 2024, 8 pages.
Barelli, L., et al. CO2 capture with sold sorbent: CFD model of an innovative reactor concept: Applied Energy Elsevier Science Publishers, GB, vol. 162, Nov. 11, 2015 (Nov. 11, 2015), pp. 58-67 XP029327377.
Search Report for PCT/US2021036696 dated Oct. 28, 2024.
Zhang, Zhibo, et al., "Zinc-based deep eutectic solvent—An efficient carbonic anhydrase mimc for CO2 hydration and conversion," Separation and Purification Technology, vol. 276 (2021) (7 pgs.).
Daniel, Thorin, et al., "Techno-economic Analysis of Direct Air Carbon Capture with CO2 Utilisation," Carbon Capture Science & Technology, vol. 2 (2022) (10 pgs.).
Holmes, Geoffrey, et al., "An air-liquid contactor for large-scale capture of CO2 from air," Phil. Trans. R. Soc. A., vol. 370 (2012), pp. 4380-4403.
Abanades, J. Carlos, et al., "Direct capture of carbon dioxide from the atmosphere using bricks of calcium hydroxide," Cell Reports Physical Science, vol. 4 (2023) (14 pgs.).
Stolaroff, Joshuah K., et al., "Carbon dioxide capture from atmospheric air using sodium hydroxide spray: Supporting Information," Environmental Science & Technology, vol. 42, Issue 8 (2008) (12 pgs.).
Fu, Chao, et al., "Techno-Economic Analyses of the CaO/CaCO3 Post-Combustion CO2 Capture From NGCC Power Plants," Frontiers in Chemical Engineering, vol. 2 (2021) (10 pgs.).
Keith, David W., et al., "A Process for Capturing CO2 from the Atmosphere," Joule, vol. 2 (2018), pp. 1573-1594.
Liu, Caroline M., et al., "A life cycle assessment of greenhouse gas emissions from direct air capture and Fischer-Tropsch fuel production," Sustainable Energy & Fuels, Issue 6 (2020) (14 pgs.).
Ghosh, Shiladitya, et al., "Mission Zero Technologies Phase 1 Final Report," Jan. 2022 (38 pgs.).
Office Action, issued by JP Patent Office, JP App. 2022-576526, issued Mar. 11, 2025.

\* cited by examiner

CONTINUOUS-MOTION DIRECT AIR CAPTURE SYSTEM

CROSS-REFERENCE TO RELATED APPLICATIONS

This application is the 35 U.S.C. § 371 national stage application of PCT Application No. PCT/US2021/036696, filed Jun. 9, 2021, where the PCT claims priority to, and the benefit of, U.S. provisional patent application No. 62/705,061, filed Jun. 9, 2020, both of which are herein incorporated by reference in their entireties.

TECHNICAL FIELD

This patent application comprises a novel and inventive approach to the direct air capture (DAC) of carbon dioxide. More specifically, the present invention contemplates a system that is capable of continuously, substantially non-stop, capturing of carbon dioxide from any number of sources such as, without limitation, ambient (i.e., atmospheric) air, flue gases from sources such as fossil fuel combustion, and combinations of carbon dioxide-containing gases which may or may not include ambient air.

BACKGROUND OF THE INVENTION

Direct Air Capture, or DAC, is a term known to describe technologies that can remove CO2 from ambient air and create a concentrated CO2 product stream that can be sold, utilized, upgraded, or sequestered underground. This is described in detail in a report published by the National Academies of Sciences in 2019 titled "Negative Emissions Technologies and Reliable Sequestration". A primary challenge for direct air capture of carbon dioxide is to achieve relatively low cost, high efficiency air contact. The present invention contemplates use of relatively shallow honeycomb monolith contactors (~15 cm deep) that permit low pressure drops ($100^{th}$'s of Pa) at gas approach velocities of 3-5 ms−1, while maintaining a relatively high geometric surface area per unit volume. This is described in U.S. Pat. No. 9,937,461. This permits minimizing costs for gas processing by allowing the use of draft fans for inducing gas movement during the CO2-removal process. Monolith contactors formed with open through channels are washcoated with porous oxide films along the channels. The adsorbent itself is, of course, critical to the efficacy of the process, as it sets the productivity levels and regeneration requirements. In the present invention, numerous types of monoliths, washcoats, and sorbent types have been used. Examples of such materials are described in U.S. Pat. Nos. 8,801,834, 9,457,340, US20120216676, and US20170080376A1. A current example of a preferred sorbent material is low molecular weight (~800 Da), highly branched poly(ethyleneimine) (PEI) that is incorporated into pores within a monolith. This allows for high volumetric amine loadings (i.e. amine sites/adsorbent volume). Solid amine adsorbents interact with CO2 via a chemical adsorptive mechanism, resulting in high CO2 adsorption capacities at very low CO2 partial pressures and high selectivity to CO2 over other components of air, such as water in the form of humidity. The presence of humidity in air improves the efficiency of the adsorbent.

Desorption is carried out more rapidly than adsorption. Desorption can be performed by contacting the CO2 laden monolith with steam, for example, so as to heat it and release the bound CO2. This rapid process can occur 10 times faster than the adsorption step. This is described in U.S. Pat. No. 9,937,461. This adsorption-to-desorption time ratio is accounted for with plant designs that incorporate a greater number of adsorption beds performing the CO2 adsorption step than those performing a desorption step. In previous designs, this was achieved by utilizing multiple monolith panels arranged in an endless loop that are physically moved through a regeneration area. This is described in U.S. Pat. No. 10,512,880. When stopped in the regeneration area, the panels seal against the regeneration box whereby a series of cycle steps are executed to perform the regeneration. Each cycle step serves a specific function to heat the monolith, collect the desorbed CO2, and cool the monolith prior to reintroduction to airflow to reduce its oxidation rate. In this process, the mechanical movement involves the need to periodically start, stop, and finely position monolith panels during each regeneration interval, which can take place in less than a few minutes. One of the disadvantages of a DAC system according to earlier embodiments with start/stop functionality resides in the mechanical challenges that can limit cycle times, lead to high wear and mechanical stress, as well as decreased reliability.

In the current invention, separate, discrete process cycle steps are replaced with a more optimal, continuous movement zonal plant design that utilizes the equivalent of multiple adsorption beds. It is contemplated according to at least one embodiment of the present invention that process plants are to be designed so that for every equivalent bed of monolith that is regenerating, multiple others (presently nine other beds of monolith are preferred) are subject to ambient airflow adsorbing CO2. This allows the capital associated with the plant process equipment to be substantially used all the time, thereby reducing the CAPEX per tonne of CO2 produced. In prior approaches, there is a challenge because the process equipment (boiler, pumps etc.) must service multiple monolith beds in a rapid, cyclic fashion. This has been addressed by physically moving monoliths in and out of the regeneration area, while the air-treating monoliths are stopped.

BRIEF SUMMARY OF THE INVENTION

A primary object of one embodiment of the present invention is to provide a continuous motion direct air capture system that will capture CO2 from the air or other mixture of gases containing CO2 and will produce a continuous stream of high purity CO2 product. The system of the present invention will result in decreased costs of DAC for the operating costs and capital expense for the system.

The present invention further demonstrates an advanced DAC process designed to reduce the cost of capturing $CO_2$ from the ambient air and other mixture of gases containing carbon dioxide, as well as the energy burden associated with the capture process. This inventive next-generation process comprises a continuous system and process, as compared to one or more earlier-generation cyclic batch processes. The use of a continuous process allows plant components to operate at steady state, thereby reducing the relative complexity of starting and stopping a movement system, eliminating the need for rapid-cycling and high-cycling valves, and significantly reducing the required utility capacity of the plant. These advantages lead to greater plant reliability, lower instantaneous utility demands and thus costs, and lower capital expense. By current estimates, the CAPEX per tonne of CO2 can be reduced by at least 33% with lower operating expense and enhanced reliability.

The present invention contemplates not only a novel process capable of continuous, substantially non-stop, capturing of carbon dioxide after adsorption, but also one or more novel embodiments of associated apparatus for generating or carrying out the novel process. Thus, practice of the novel process or method of this invention may be carried out by one or more types of apparatus and shall be considered as coming within the scope of the present invention.

The system and process according to the present invention utilizes a substantially continuous relative movement and treatment of a series of sorbent-containing monoliths, in the form of a continuous loop of sorbent monoliths subject to a plurality of process zones; specifically, the continuous loop of monoliths is formed of lines of small monoliths, preferably placed immediately adjacent each other, both vertically and horizontally. This forms, preferably, a substantially continuous wall of monoliths. Specifically, the continuous loop of monoliths is formed of lines of small monoliths, preferably placed immediately adjacent each other, both vertically and horizontally. This forms, preferably, a substantially continuous wall of monoliths. Process zones in this context mean zones of fluid flow through the monolith at a specific temperature, pressure, and composition to either adsorb CO2 from a dilute mixture, or to be regenerated to release and capture relatively pure CO2. Each process zone serves a specific and distinct function that creates a process cycle for the sorbent passing through it, as part of the regeneration and CO2-capture processes. These process zones replace process cycle steps utilized in the batch process. In different embodiments, the sorbent monoliths in the loop remain stationary and the apparatus containing the regeneration process zones moves, or the sorbent monoliths move, around the loop, passing through the regeneration apparatus; either embodiment thus providing the equivalent relative movement and the equivalent function while passing through the stationary regeneration apparatus.

Suitable monoliths and sorbents for use in this invention are described for example in copending, commonly owned International Applications Nos. PCT/US2021/023473 and PCT/US2020/61690. The description of the monoliths in copending PCT/US2021/023473 is hereby incorporated by reference as if fully repeated herein. The continuous monolith wall could possibly be formed of one or a few very large, extruded pieces, but as shown in commonly owned International Application No. PCT/US2021/023473, they could be more easily assembled from relatively small monolithic blocks, as if building a brick wall.

DETAILED DESCRIPTION OF THE INVENTION

The system and process according to one embodiment of the present invention utilizes a substantially continuous relative movement of a series of sorbent monoliths, forming in one embodiment a continuous loop of sorbent monoliths subjected to a plurality of process zones; as shown in FIG. 1, FIG. 2, FIG. 3, and FIG. 4, the loop of monoliths move substantially at a constant rate past sources of a flow of air and through process zones for regenerating the sorbent. Process zones here mean zones of fluid flow through the monolith at a specific temperature, pressure, and composition. Each process zone serves a specific and distinct function that creates a process cycle for the sorbent passing through it, as part of the adsorption and regeneration and CO2-capture processes. These process zones replace process cycle steps utilized in the batch process. In another embodiment shown in FIG. 5 and FIG. 6, the loop of sorbent monoliths remain stationary and the regeneration apparatus (Chamber 506, in FIG. 5), containing the regeneration process zones moves, thus providing the equivalent relative movement and the equivalent function.

Regeneration of the sorbent, by desorption of CO2 is performed by a temperature swing delivered by condensation of, e.g., saturated steam directly onto the monolith surface, raising the temperature to ~70-130° C. The zones within the regeneration apparatus, located before and after this desorption zone, serve to both maintain sorbent lifetime and to achieve relatively higher CO2 purity, as shown in FIG. 1, FIG. 2, FIG. 3, and FIG. 4. The core sequence of a regeneration process cycle can include the following steps:

i. reduction in O2 concentration surrounding the monolith in the first zone of the regeneration box;
ii. direct contact condensation of steam to heat the monolith and desorb CO2 in a central zone of the regeneration box; and
iii. cooling of the monolith by evaporation of condensed water on its surface in the final zone of the regeneration box.

Figure 4:
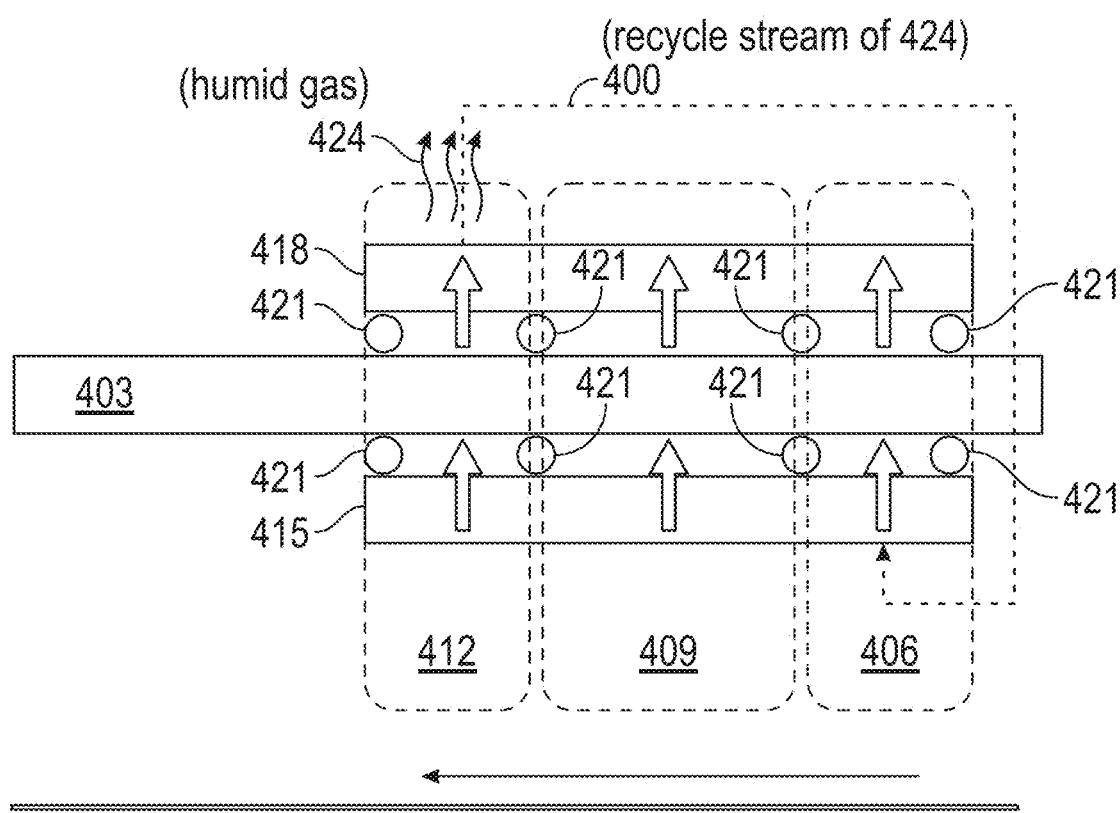
FIG. 4 shows a conceptual schematic plan view of the three-zone regeneration apparatus with a heat recycle stream.

Further, internal heat integration can be accomplished by recycling the stream resulting from steps ii) or iii) and including it in step i) or by the addition of a step (and a zone) between step i) and ii) as shown in FIG. 4. Internal heat integration is beneficial because it can reduce the total energy required per cycle, thereby reducing the cost of CO2 capture by the process. A continuous design is advantaged over a batch process design in using internal heat integration in that process fluids can be directly recycled within the same monolith plants. In previous embodiments, process fluids could be shared for heat integration only between sister monolith plants.

Primary fluid inputs to the system of this invention are ambient air, one or more inert gases, such as, without limitation, N2 and makeup water. Exiting the plant are CO2-lean air containing water vapor, a N2/air mixture containing water vapor, and product CO2. CO2 will exit the plant boundaries at slightly elevated temperature and pressure saturated with water. For certain applications, further purification of CO2 may be utilized using established methods as needed. Previously consumable process fluids such as inert gasses can be recycled internally according to the present invention, such as to form a nearly closed loop to limit overall consumption of treatment fluids and reduce costs.

The continuous process according to the present invention maintains a basic movement concept, but by operating the process continuously, eliminates the need for starting and stopping of the system. Additionally, the proposed invention embodiment will allow process equipment to deliver fluids at steady state, rather than intermittently. This will result in reduced costs (i.e., smaller scale equipment, lower pressure steam generation, and lower cost vacuum pumps).

A plurality of what are herein referred to as "Regeneration Zones" or regeneration stages, are utilized according to this invention for the collection of CO2 adsorbed during exposure to airflow. The Regeneration Zones are carried out within a regeneration and carbon dioxide harvest assembly, enclosed within a sealed chamber 115 and 215 in FIGS. 1 and 2, respectively, and as 506, 606, and 1906 in FIGS. 5, 6, and 19, respectively, and as 706, 806, and 906 in FIGS. 7-9, respectively.

In the later-generation continuous process described here, some of these regeneration stages can be carried out with an inert gas, a recycled product CO2 stream, or excluded altogether. Critically, CO2 is being neither adsorbed nor desorbed in steps i) or iii), so minimizing their cumulative step times is important for maximizing productivity. Step ii) is done at constant pressure and CO2 is removed as it is evolved by a vacuum pump or blower. This approach produces a steam/CO2 mixture that, after passing through a condenser/separator, gives concentrated a CO2 product of up to 95% purity.

There are many ways of implementing the general process description that is provided above. Examples of different possible embodiments are described below:

DETAILS OF DRAWING FIGURES

Figure 1:
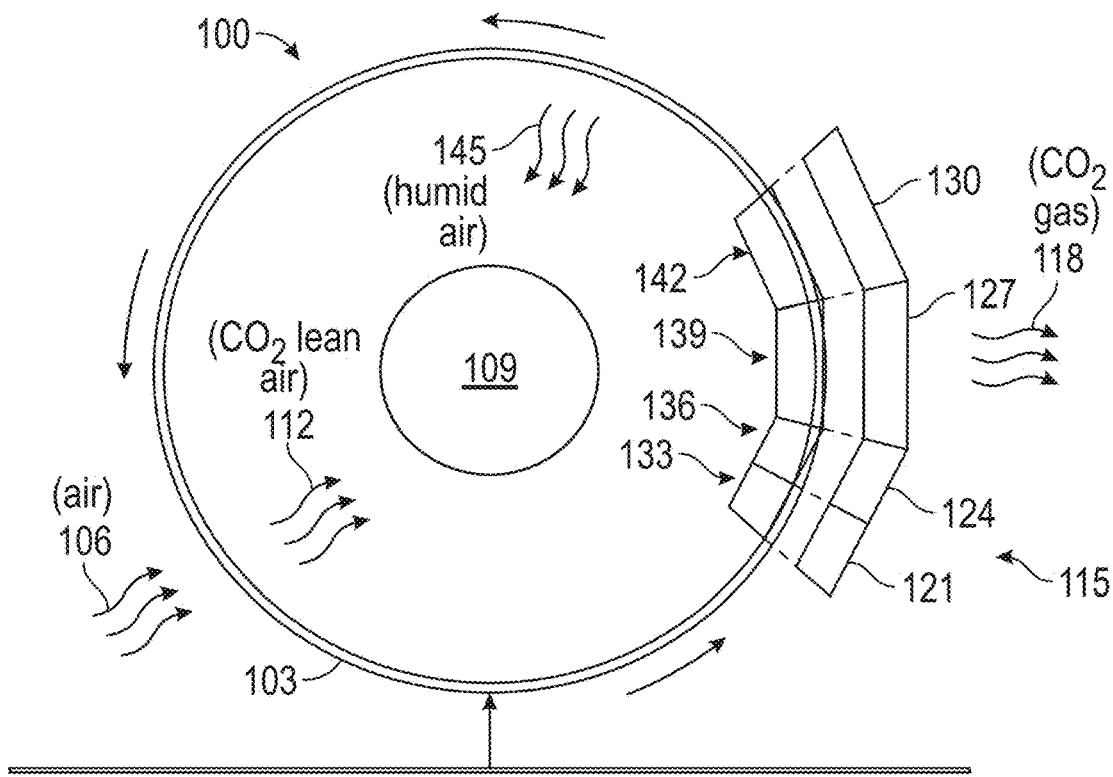
FIG. 1 is a Schematic showing a conceptual plan view of a continuous DAC process system having a four-zone regeneration box.

FIG. 1 is a Schematic showing a conceptual plan view of a continuous DAC process, having a four-zone regeneration box. Each monolith (100) supports a CO2 sorbent, preferably in a mesoporous layer within open channels formed through each monolith, and moves in a direction around a track (103) where air (106) passes through each monolith via a fan or set of fans (109). Air enters the monolith channels (100), CO2 is adsorbed by the sorbent in the monolith, and CO2-lean air (112) exits the monolith and is discharged from the fan or set of fans as exemplified in FIGS. 9-11. Each monolith (100) in turn enters the sealed regeneration apparatus (115) and is regenerated, producing concentrated CO2 (118), through a set of zones (121) through (130). In this 4-zone process schematic, the first zone (121) is an inert gas purge (133) that removes any air from the monolith channels and pores; the second zone (124) is a rapid steam sweep (136) to remove the inert gas such as to allow for high purity CO2 production; the third zone (127) is the Regeneration and Harvest zone where steam is injected (139), condenses on the monolith, and CO2 is produced (118) and harvested for storage or further use; the fourth zone (130) is the cooling zone, where inert gas (142) is passed through the monolith channels to cool them prior to reintroduction to airflow. Humid air (145) exhausts from the monolith to further cool and dry as it reenters airflow. As the continuous monolith loop enters the chamber containing the regeneration and carbon dioxide harvest assembly, it passes between sealing members sealing off the interior of the chamber from the outside air. Many embodiments of such sealing members are available, two preferred examples of sealing members are shown in FIGS. 12-15. A pair of sealing members also separates each of the several zones within the regeneration and carbon dioxide harvest assembly chamber 115.

Figure 2:
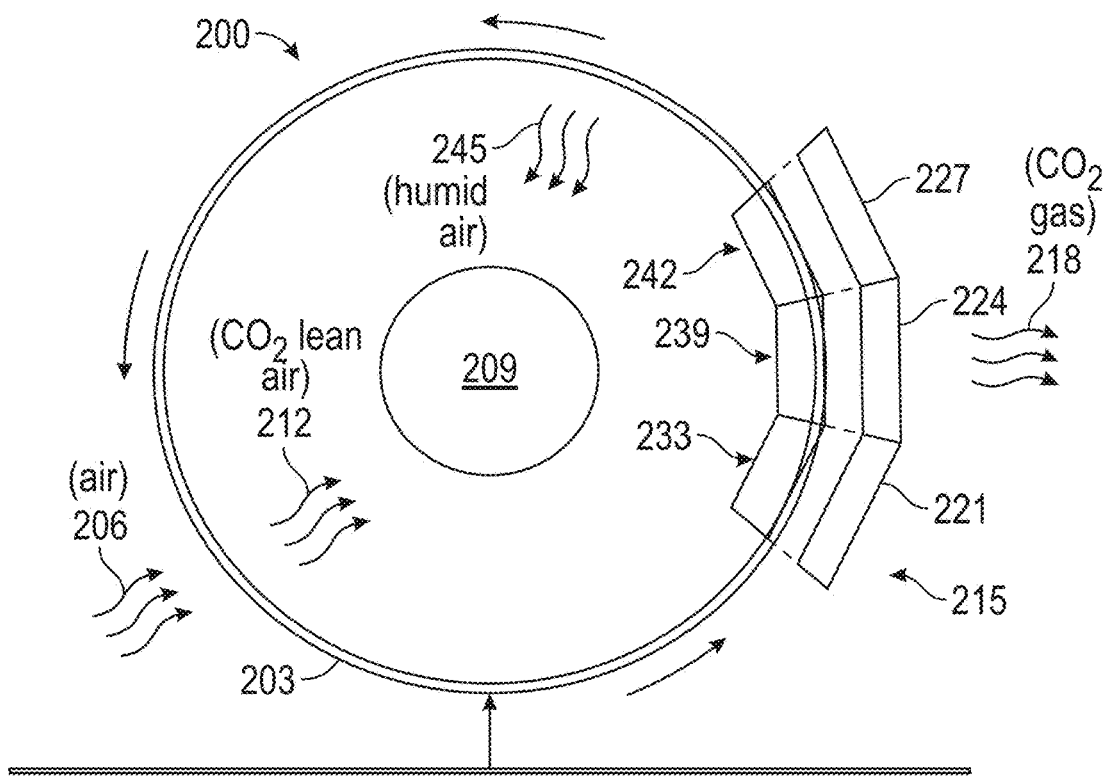
FIG. 2 is a Schematic showing a conceptual plan view of a continuous DAC process, having a three-zone regeneration box.

FIG. 2 shows a conceptual plan view of a three-zone continuous process. The monolith (200) moves in a direction around a track (203) where air (206) is drawn through it via a fan or set of fans (209). Air (206) enters the monolith (200), CO2 is adsorbed onto the monolith channel surfaces, and CO2-lean air (212) exits the monolith and is discharged from the fan or set of fans (209). The monolith enters the regeneration apparatus (215) and is regenerated, producing concentrated CO2 (218), through a set of zones (221) through (227). In this 3-zone process schematic, the first zone (221) is a gas purge (233) that removes O2 from the monolith channels. This can be performed by a variety of gas streams including N2, CO2, steam, flue gas, and mixtures of these gases. This zone serves to improve the material lifetime by preventing oxidation but also removes air that exists in the monolith channels that can reduce the purity of CO2 produced (218). The second zone (224) is the Regeneration and Harvest zone where steam is injected (239), condenses on the monolith, and CO2 is produced (218); the third zone (227) is the cooling zone, where inert gas (242) is passed through the monolith channels to cool them prior to reintroduction to airflow. Humid air (245) exhausts from the monolith to further cool and dry as it reenters airflow.

Figure 3:
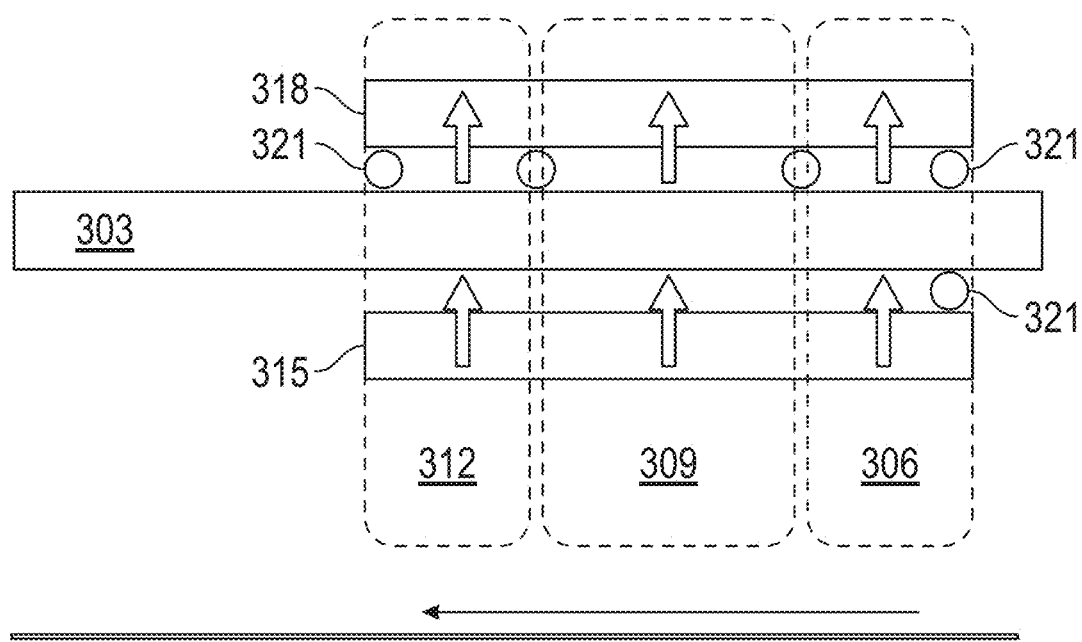
FIG. 3 is a Schematic showing a conceptual plan view of the regeneration apparatus with a three-zone process basis.

FIG. 3 shows a conceptual schematic plan view of a three-zone regeneration apparatus. The monolith (303) moves through the regeneration zones (306) through (312), where process fluids are delivered. Process fluids flow from the delivery side (315) of the desorption apparatus to the gas collection side (318). The zones are separated from one another by seals (321) to isolate process fluids in one zone from the fluids in another zone from the exterior both at the entrance and exit from the assembly chamber 115 and 215, respectively, as shown in FIGS. 1 and 2. The monolith moves in a direction such that the first zone (306) is the purge zone; the second zone (309) is the regeneration and harvest zone, and the third zone (312) is the cooling zone.

FIG. 4 shows a conceptual schematic plan view of the three-zone regeneration apparatus of FIG. 3 with a heat recycle stream 400. The monolith (403) moves through the regeneration zones (406) through (412), where process fluids are delivered. Process fluids flow from the delivery side (415) of the desorption apparatus to the gas collection side (418). The zones are separated from one another by seals (421) to isolate process fluids in one zone from the fluids in another zone from the exterior both at the entrance and exit from the assembly chamber 115 and 215, respectively, as shown in FIGS. 1 and 2. The monolith moves in a direction such that the first zone (406) is the purge zone; the second zone (409) is the regeneration and harvest zone, and the third zone (412) is the cooling zone. Hot humid gas (424) exiting the third zone (412) is recycled to the first zone (406) to both perform the function of zone one but also to preheat the monolith before it enters zone two.

Figure 5:
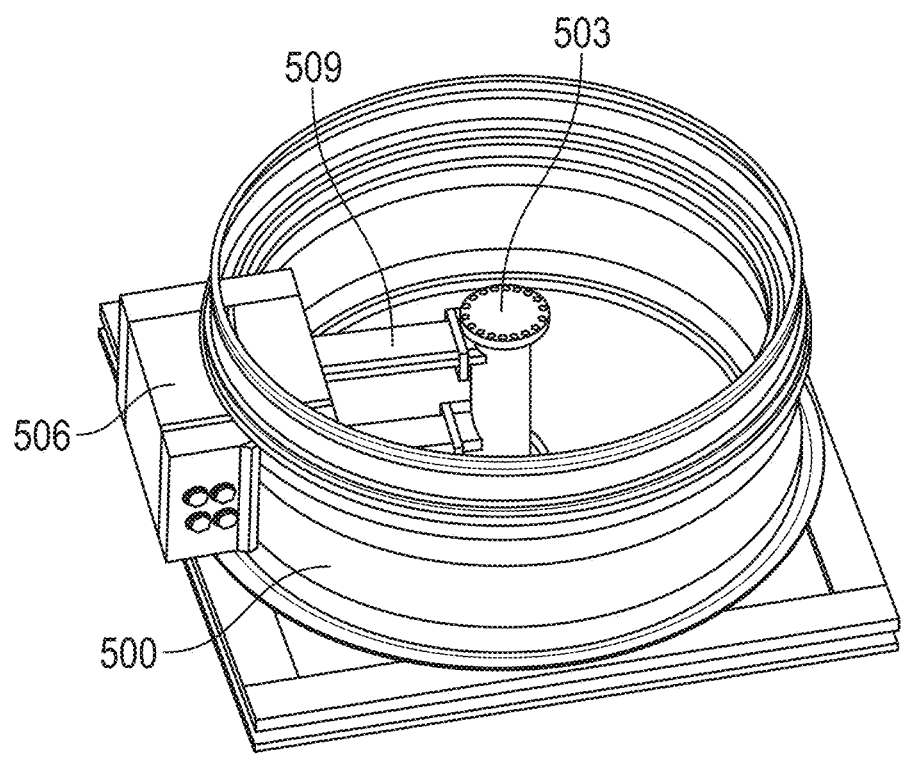
FIG. 5 is an isometric schematic picture of apparatus for carrying out the DAC processes shown in FIGS. 1-4, showing a moving regeneration apparatus moved by a spoke powered from a central pivot.

FIG. 5 shows the concept of moving the regeneration unit about a center pivot. Monoliths (500) are arranged as a ring with a center axis point (503) at the center. The regeneration apparatus (506) rotates around the monolith (500) to deliver the regeneration conditions to each monolith in turn. The center axis point (503) is connected to the regeneration apparatus (506) by pivot arms (509). Process fluid piping is routed to and from the regeneration apparatus through the pivot arms (509). The continuous nature of the monolith loop is clearly depicted by the exterior and interior circumferential walls of the monolith loop as displayed in FIGS. 5, 8-10, and 16, 17 and 19. The continuity of the monolithic loop is best displayed by the schematic diagram of FIGS. 3, 4.

Figure 6:
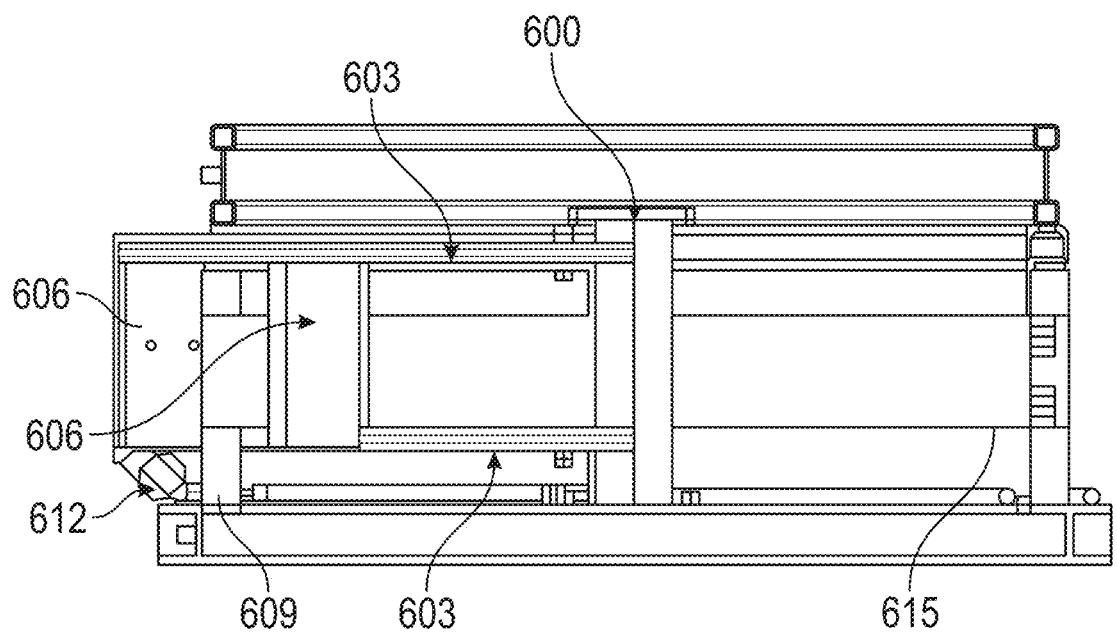
FIG. 6 is a schematic cross sectioned elevation view of the apparatus with central pivot of FIG. 5.

FIG. 6 is a schematic cross sectional, elevation view of the apparatus with a central pivot or axis point of FIG. 5. Process piping routes in and out of the central pivot (600) via the pivot arms (603) to supply the process fluids to the regeneration apparatus (606). The center pivot (600) allows for rotation of large rotary union joints for fluid piping. The regeneration apparatus (606) is driven about the track (609) with industrial guide wheels (612). The monoliths (615) are mounted above the regeneration unit's track system and the regeneration unit (606) encloses both sides of the monoliths (615).

Figure 7:
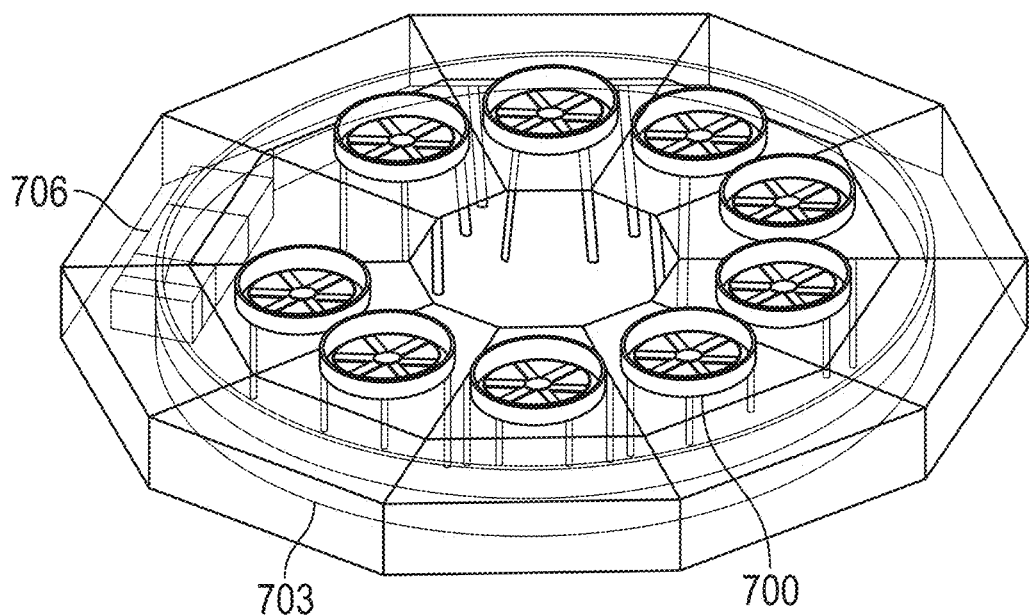
FIG. 7 is a schematic isometric top view of apparatus for carrying out a DAC process showing a top mounted multi-fan arrangement.

FIG. 7 shows a top mounted fan configuration for the systems of FIGS. 1-4. In this design, fans (700) are mounted in the horizontal plane (to rotate about a vertical axis, on the top face of the carbon dioxide capture plant. The fans (700) move air by induced draft, pulling air in through the monoliths (703) ejecting air out the top. The fans (700) are arranged along the perimeter of the monolith (703) track. A portion of the track is designated to the regeneration apparatus (706).

Figure 8:
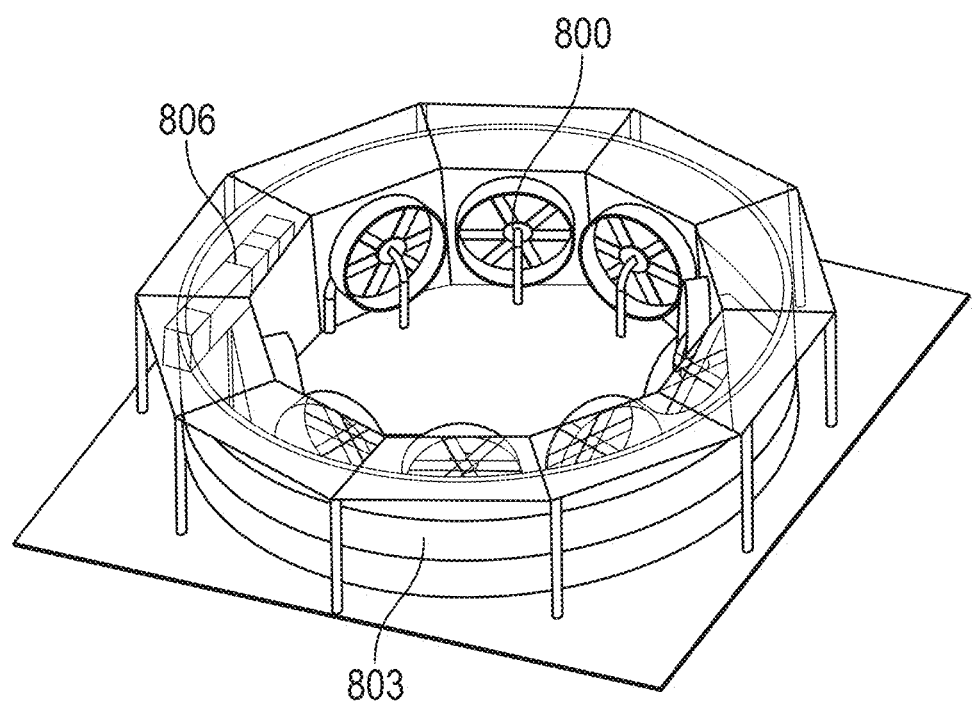
FIG. 8 is a schematic isometric top view of apparatus for carrying out a DAC process showing an interior-side mounted multi-fan arrangement for each sorption zone.

FIG. 8 shows an interior side mounted fan configuration. In this design, fans (800) are mounted in the vertical plane on top of the carbon capture plant. The fans (800) move air by induced draft, pulling air in through channels of the monoliths (803) and ejecting air inwards towards the center of the plant. The fans (800) are arranged along the perimeter of the monolith (803) track. A portion of the track is designated to the regeneration apparatus (806).

Figure 9:
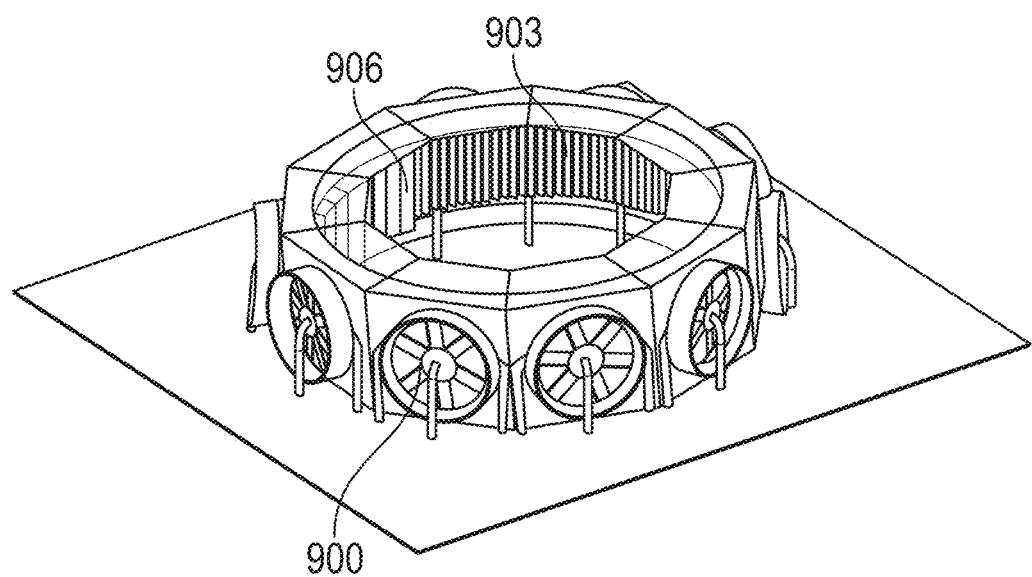
FIG. 9 is a schematic isometric top view of apparatus for carrying out a DAC process showing an exterior-side mounted multi-fan arrangement for each sorption zone.

FIG. 9 shows the exterior side mounted fan configuration. In this design, fans (900) are mounted in the vertical plane along the exterior perimeter of the carbon capture plant. The fans (900) move air by induced draft, pulling air in through the channels of the monoliths (903) and ejecting air out radially away from the plant. The fans (900) are arranged along the perimeter of the monolith (903) track. A portion of the track is designated to the regeneration apparatus (906).

Figure 10:
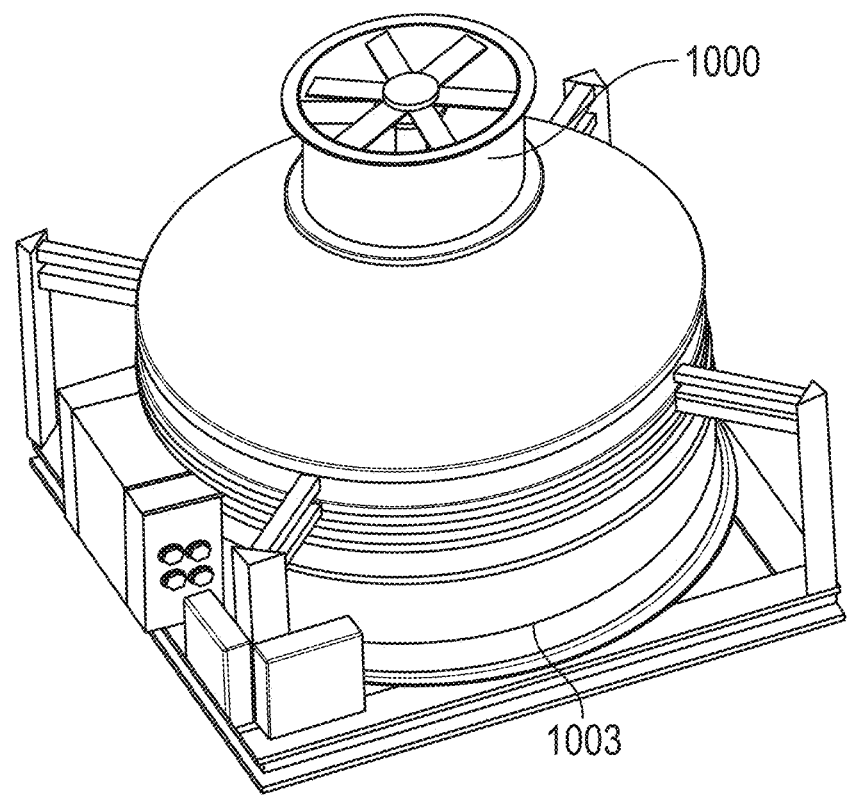
FIG. 10 shows a schematic isometric top view of apparatus for carrying out a DAC process showing a single top mounted fan for the entire loop.

FIG. 10 shows the single top mounted fan configuration. In this design the fan (1000) is mounted in the horizontal plane on the top structure of the direct air carbon capture (DAC) plant. The fan (1000) moves air by induced draft, pulling air in through the channels of the monolith (1003), and ejecting air out upwards away from the plant.

Figure 11:
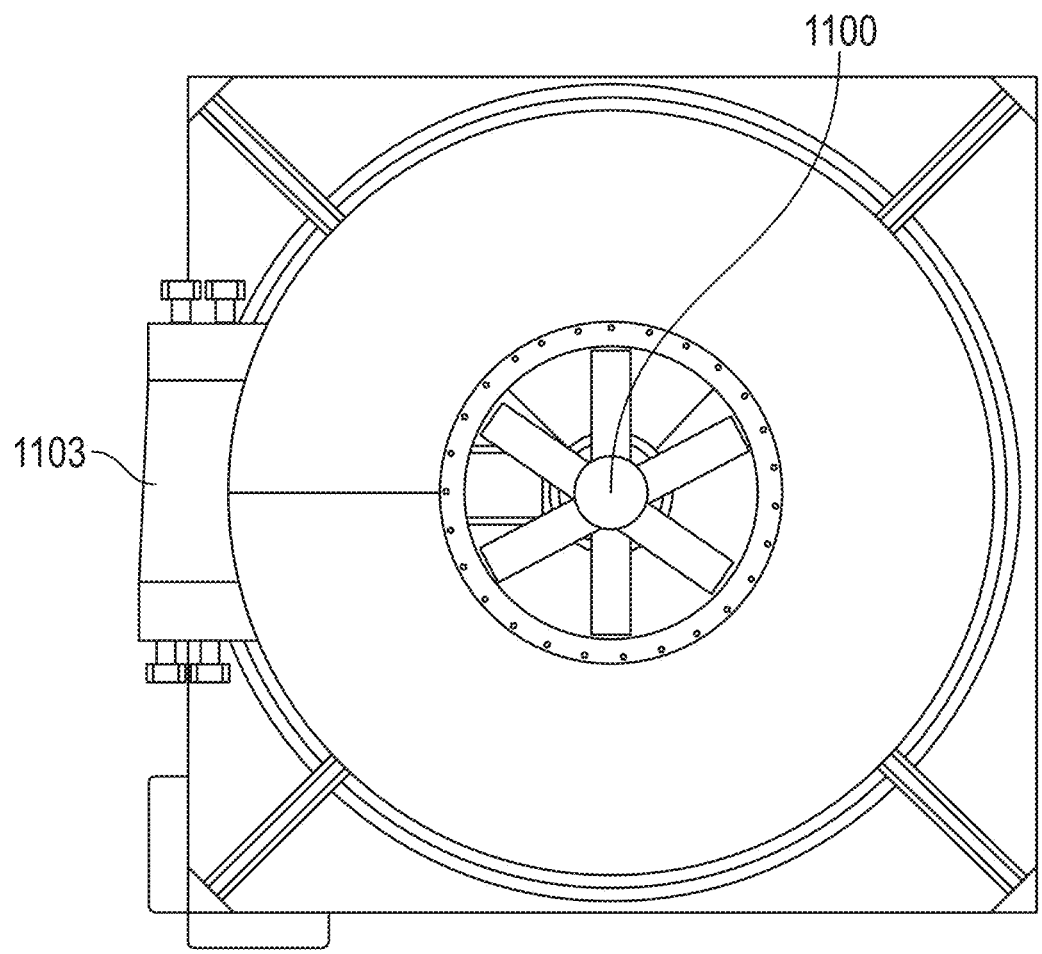
FIG. 11 shows a diagrammatic plan view of apparatus for carrying out a DAC process showing a single top mounted fan, as in FIG. 10.

FIG. 11 shows a plan view of the single top mounted fan arrangement, as exemplified by FIG. 10. The fan (1100) is in the center of the roofing material or deck, and the regeneration apparatus (1103) occupies a portion of the monolith track.

Figure 12:
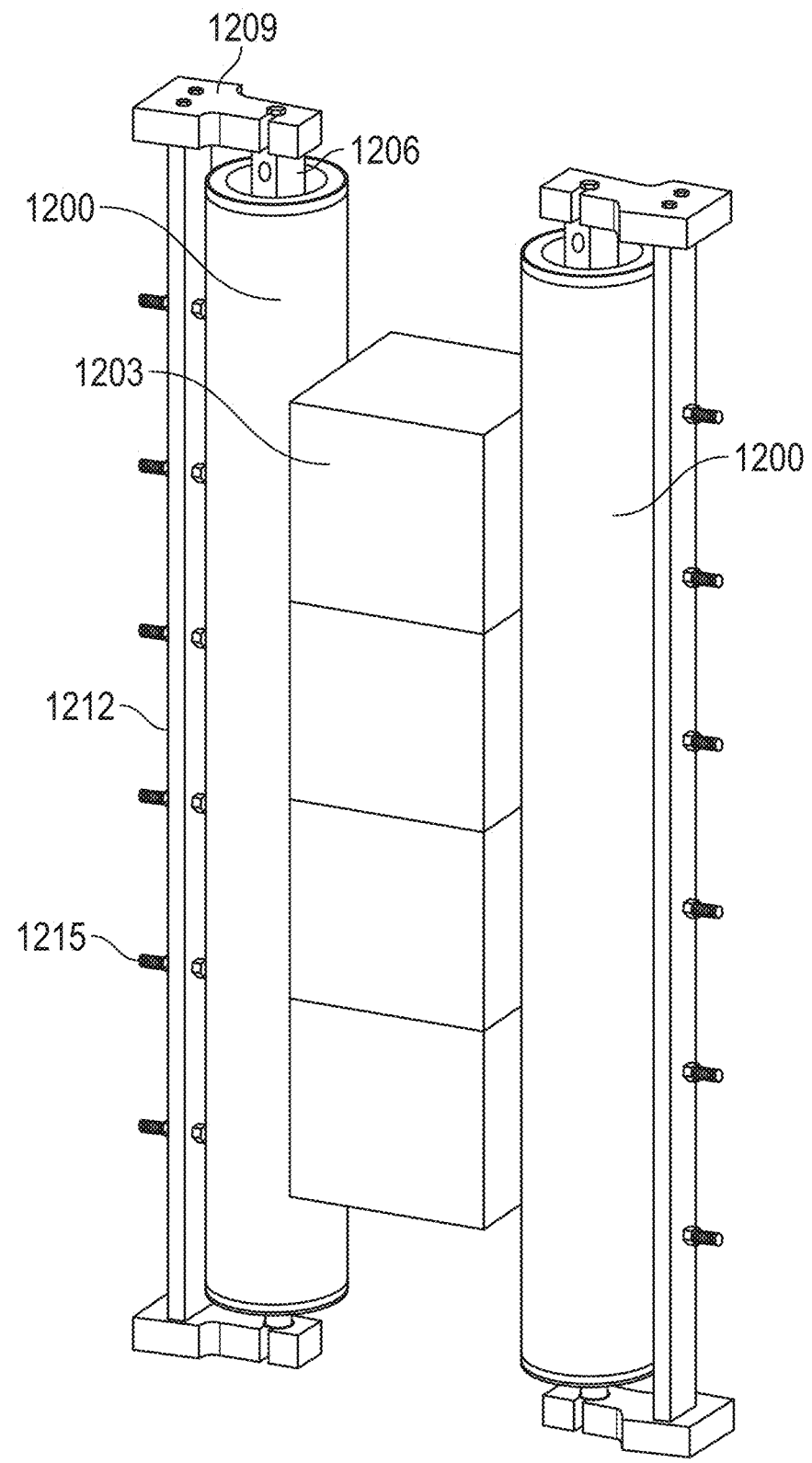
FIG. 12 shows a schematic isometric top view of apparatus for providing a foam roller seal assembly to seal monoliths within a regeneration box, or apparatus.

FIG. 12 shows a schematic of two roller seal assemblies which together create one embodiment of a seal, forming a single boundary between two zones of a regeneration apparatus, or between the first and last zones of the regeneration apparatus and the exterior of the regeneration chamber. The roller seal is comprised of a foam material (1200) that wraps around a steel pipe. The roller seals press against the monolith (1203) face to form a physical seal. The seal assembly is spring-loaded to maintain compression.

As shown, the monolith loop is formed of stacked individual small monolith (1203) blocks. The seal assembly has an internal hex rod (1206) that runs through the length of the pipe, and which is mounted with set screws to blocks (1209) on the top and bottom of the assembly. Those blocks (1209) are then mounted to a tensioning bar (1212). The tensioning bar (1212) is then in turn mounted to inner or outer walls of a regeneration unit with shoulder screws (1215) that can slide through their mounting holes in the tensioning bar (1212) and compress springs that reside along the shoulder (1215) of the screw.

Figure 13:
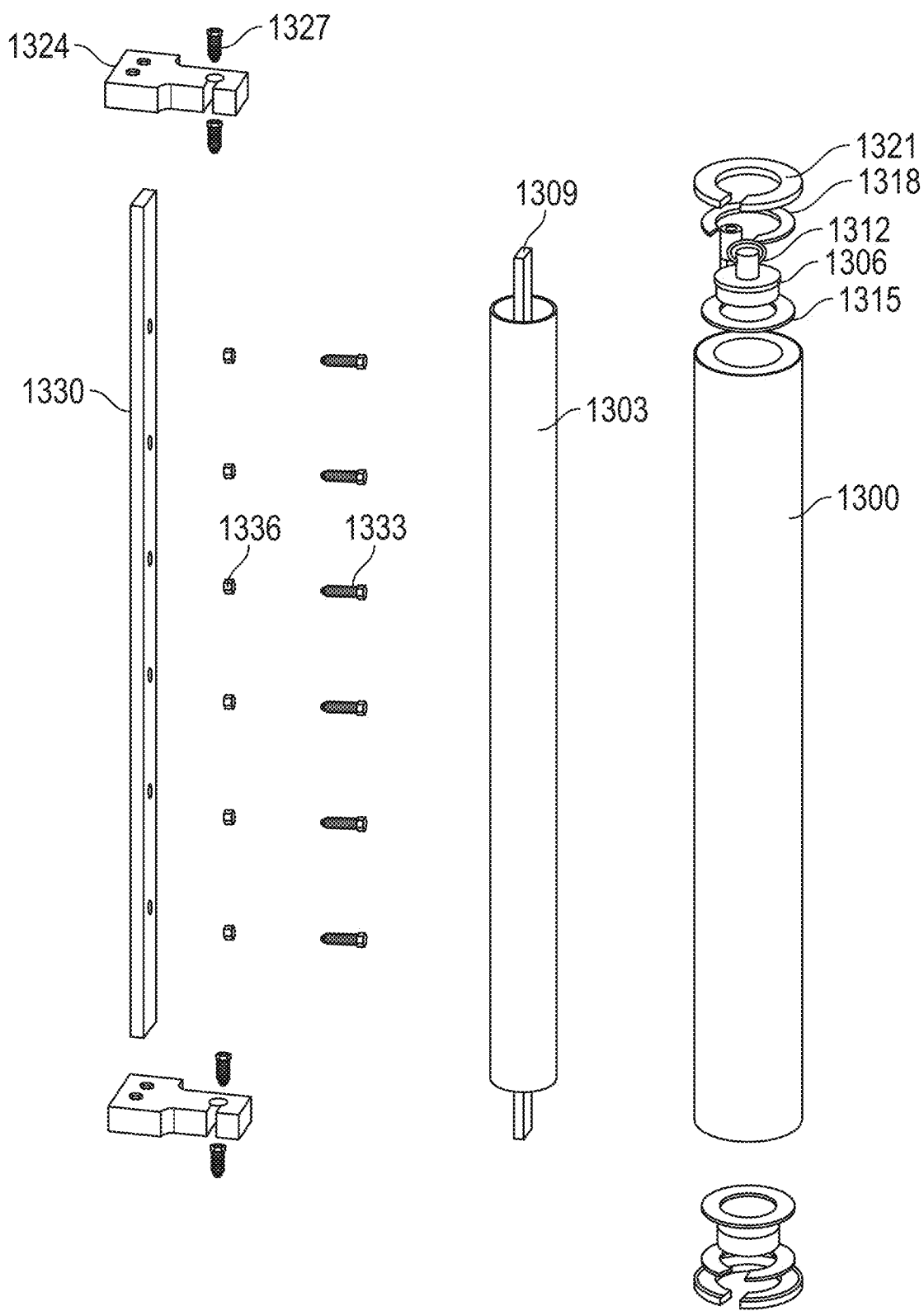
FIG. 13 shows an exploded view of the foam roller seal assembly of FIG. 12.

FIG. 13 shows an exploded view of the polymer foam, e.g., silicone, roller seal assembly of FIG. 12 and all of its components. The foam (1300) is the main sealing element and wraps around a solid steel pipe (1303). Conveyor bearings (1306) are pressed into each end of the steel pipe (1303), and a hex rod (1309) runs through the length of the seal. The conveyor bearings (1306) work by rotating freely around the internal rod as long as the rod is held stationary. A magnetic non-contact radial encoder (1312) is mounted to the top conveyor bearing (1306). There is a steel washer (1315) adhered to the top and bottom faces of the silicone foam (1300). Needle thrust bearings (1318) are pressed into a Delrin gasket (1321), which is mounted to a regeneration unit and as the foam roller (1300) rotates the thrust bearings (1318) make contact with the washer (1315) and create the minimum gap possible that also allows for movement. The internal hex rod (1309) is mounted to the top and bottom blocks (1324) held with a set of 4 screws (1327). The top and bottom mounting blocks (1324) are mounted to a tensioning rod (1330) again with a set of screws. The tensioning rod (1330) is then in turn fixed to a regeneration unit's internal or external walls with shoulder screws (1333). These shoulder screws (1333) allow the seal assembly to move when compressing the springs (1336), which are coupled with the shoulder screws (1333). This compression ensures that the roller seal is always making good contact with the monoliths. Other embodiments can achieve this same result.

Figure 14:
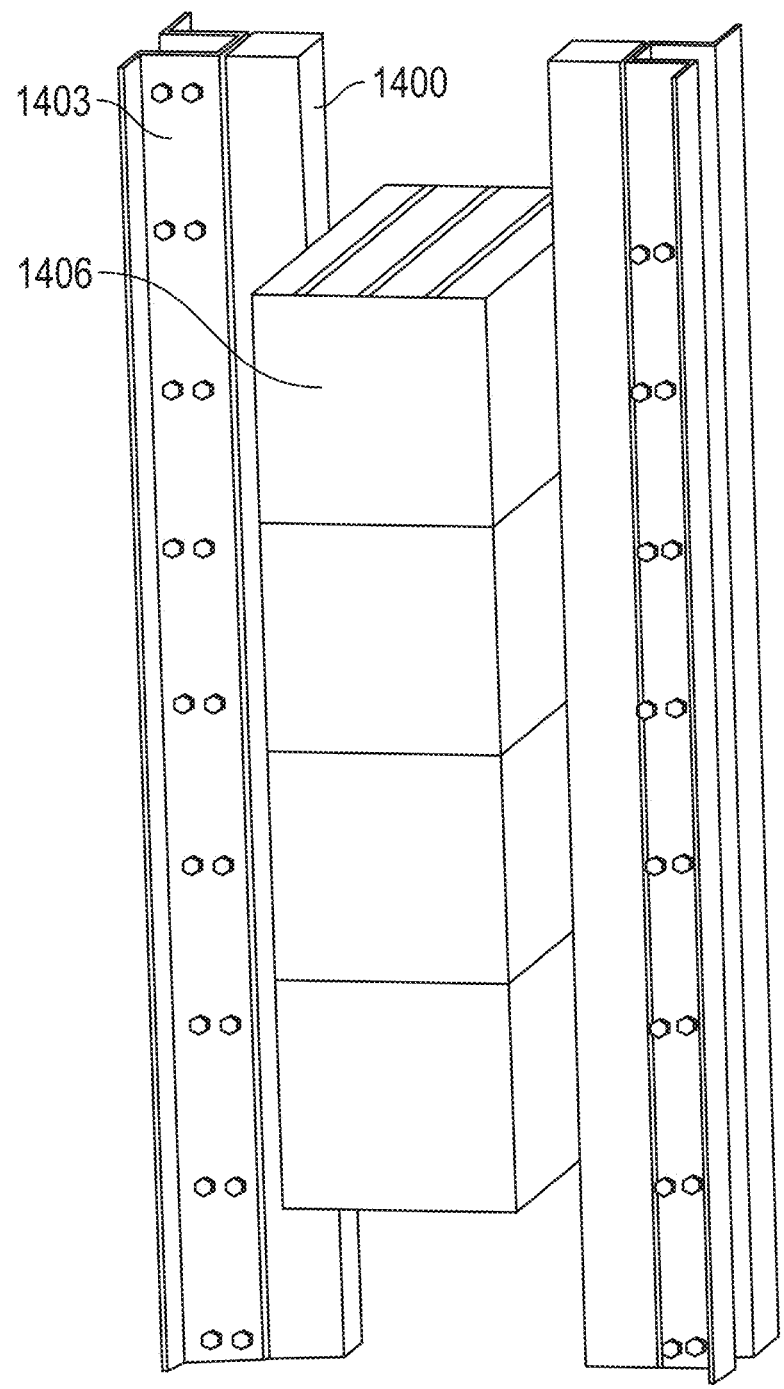
FIG. 14 shows a schematic of a labyrinth seal assembly that creates a boundary between two zones.

FIG. 14 shows an elevation view of another example of a seal, a so-called labyrinth seal assembly that creates a boundary between two zones. The seal is made up of a series of wiper blades (1400) that are bolted together and mounted to the internal or external walls of a regeneration unit with two angle brackets (1403). The wiper blades are positioned very close to the monolith (1406).

Figure 15:
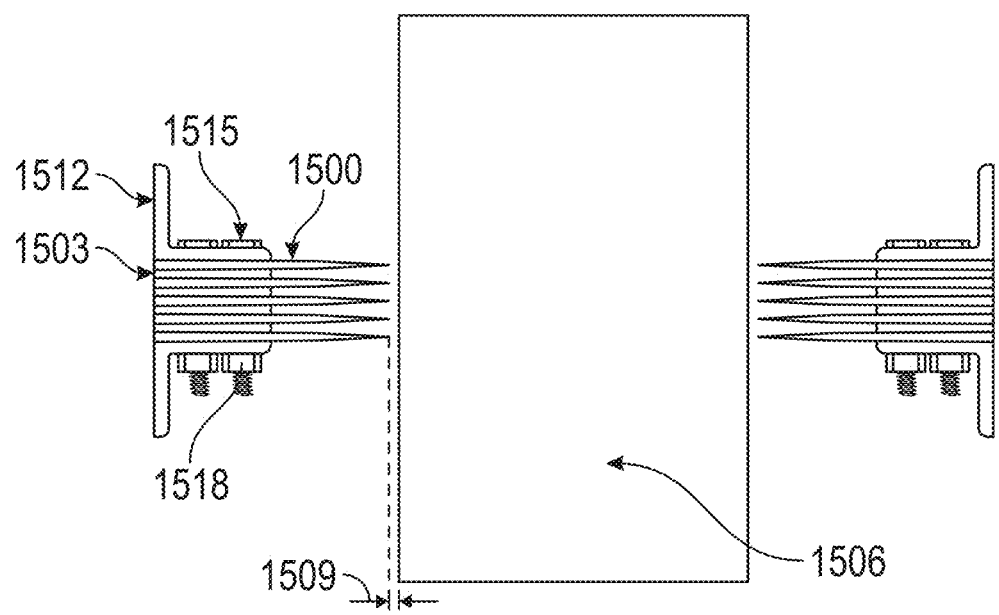
FIG. 15 shows a top-down view of a labyrinth seal assembly.

FIG. 15 shows a top planar view of the labyrinth seal assembly. A series of wiper blades (1500) and spacers (1503)

comprise the sealing elements. The wiper blades (1500) do not directly contact the monolith (1506). There remains a gap of distance (1509) that can range between ¹⁄₁₆th inch to 1 inch depending on the allowable tolerances of the system. The series of wiper blades (1500) and spacers (1503) are bolted together in between two pieces of angle iron (1512) with bolts (1515) and locking nuts (1518).

Figure 16:
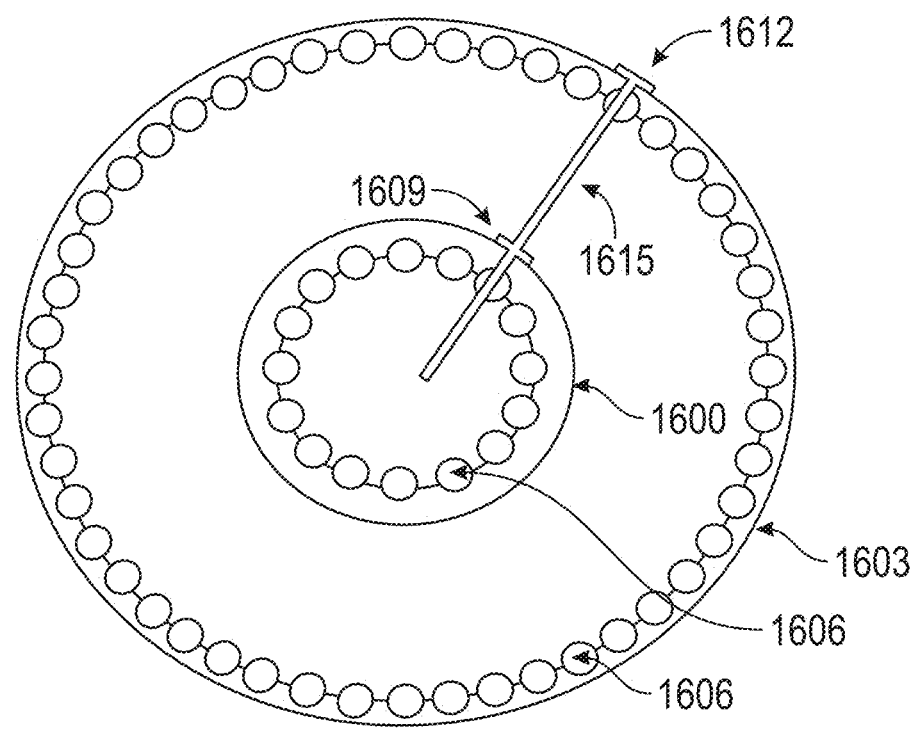
FIG. 16 depicts a Concentric loop concept for operating a plurality of monolith loops.

FIG. 16 depicts an example of a concentric loop concept for powering a plurality of monolith loops. Here, an inner loop (1600) of monoliths is placed inside of an outer loop (1603) of monolith. Each loop has fans (1606) located around its perimeter in a top mounted, side mounted, interior, or exterior orientation. The inner loop (1600) has a regeneration apparatus (1609), and the outer loop (1603) has a regeneration apparatus (1612). A spoke (1615) connects both regeneration apparatuses to continuously move both loops.

Figure 17:
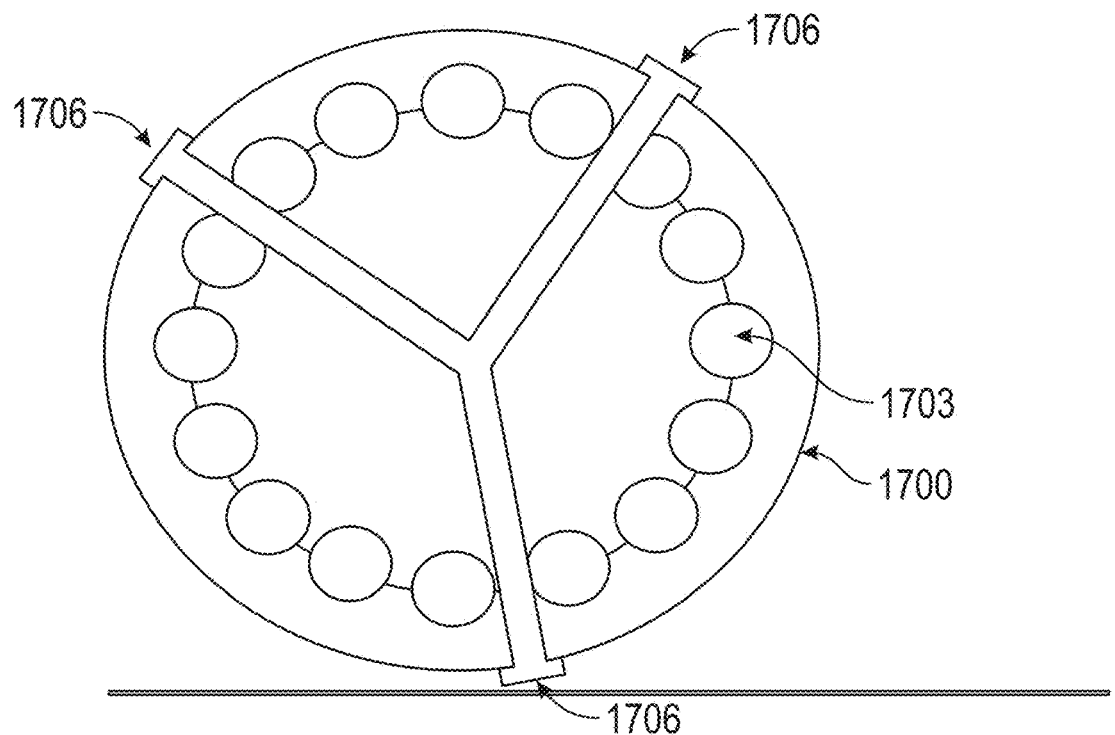
FIG. 17 shows a multi-regeneration apparatus concept. A monolith loop (1700) is serviced by fans (1703) placed and more than one regeneration apparatus (1706). Each regeneration apparatus (1706) moves relative to the monolith at a constant rate.

FIG. 17 depicts diagrammatically one embodiment of a loop of monoliths serviced by a plurality of regeneration boxes. The air through the monolith channels on the loop (1700) is moved by fans located within the loop by fans (1703) placed adjacent each monolith. Each of the several regeneration apparatus (1706) moves relative to the monolith at a constant rate, either by the monoliths being moved around the loop, or by the regeneration apparatus each being moved around the loop.

Figure 18:
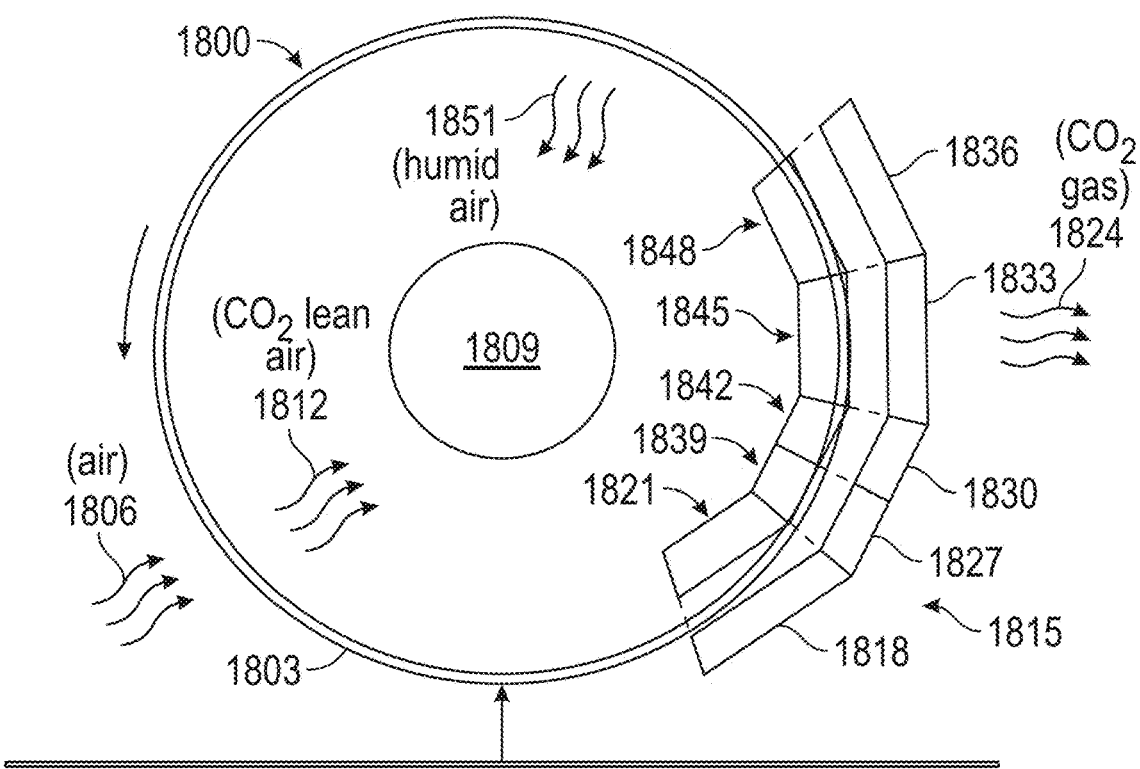
FIG. 18 shows a flue gas injection adsorption zone immediately preceding a four-zone regeneration.

FIG. 18 shows a conceptual plan view of another embodiment of the four-zone continuous regeneration process with an immediately preceding adsorption zone where the monolith is treated with a flue gas injection just prior to its entering the regeneration location. The prior zones as the monolith (1800) moves in a direction around a track (1803) where air (1806) is drawn into each monolith, for example by a fan or set of fans (1809). Air enters the monolith (1800), CO2 in the air is adsorbed onto the monolith surface, and CO2-lean air (1812) exits the monolith and is discharged from the fan or set of fans, e.g., FIGS. 8-11. Before a monolith (1800) enters the regeneration apparatus (1815), it enters a flue gas injection zone (1818), where flue gas (1821) is injected into the monolith channels and further CO2 is adsorbed onto the monolith. The monolith (1800) enters the regeneration apparatus (1815) and is regenerated, producing concentrated CO2 (1824), through a set of zones (1827) through (1836). In this 4-zone process schematic, the first zone (1827) is an inert gas purge (1839) that removes O2 from the monolith channels; the second zone (1830) is a rapid steam sweep (1842) to remove the inert gas such as to allow for high purity CO2 production; the third zone (1833) is the Regeneration and Harvest zone where steam is injected (1845), condenses on the monolith, and CO2 is produced (1824) and harvested; the fourth zone (1836) is the cooling zone, where inert gas (1848) is passed through the monolith channels to cool them prior to reintroduction to airflow. Humid air (1851) exhausts from the monolith to further cool and dry as it reenters airflow.

Figure 19:
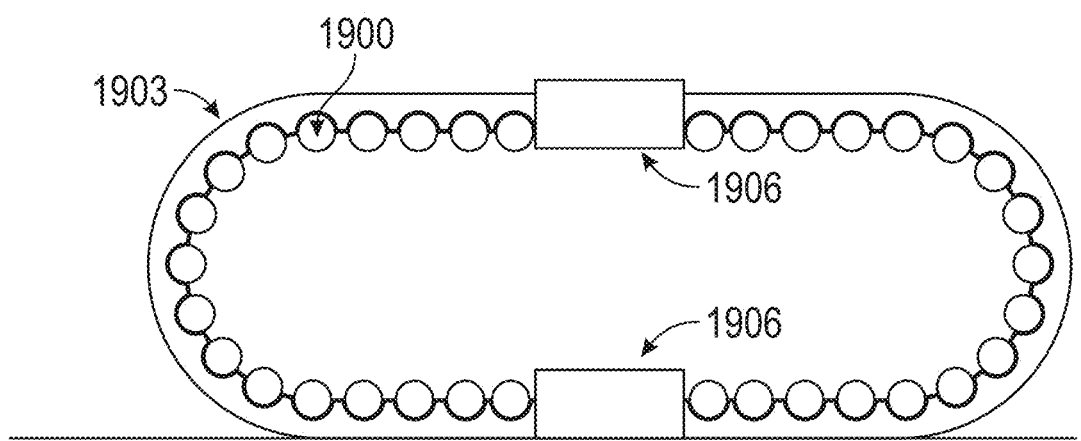
FIG. 19 depicts a non-circular track concept.

FIG. 19 another embodiment including a non-circular track concept. A loop of monoliths is arranged in a non-circular shape, where the monoliths move around the perimeter where fans (1900) draw air through them. The monolith loop (1903) enters a regeneration apparatus (1906), where CO2 is produced. There can be one or more regeneration apparatuses (1906) depending on the movement speed.

Further Detailed Discussion of Invention

Four Zone Process Design

In one embodiment of the current invention, the sorbent regeneration is performed with four zones. Zone 1 can employ a first gas, such as, without limitation, N2, sweep to reduce the oxygen level in the monolith such that the temperature can be raised. Zone 2 will employ a second gas, such as, without limitation, steam or CO2, to sweep the first gas from the monolith to enable a high purity CO2 product to be collected. Zone 3 will provide steam injection at a controlled rate to heat the sorbent and produce a CO2/Steam mixture. Zone 4 employs a flow of a third gas, or a mixture of inert gas and air, through the monolith channel to cool it before returning to airflow. When a monolith exits Zone 4, it will move into an airflow zone where air is drawn through the open channels by an induced draft fan located, for example, at the center of the structure and exhausting upwards.

See FIG. 1, which illustrates the continuous DAC process according to the present invention. CO2 is adsorbed within the monolith during airflow as it moves around the ring before entering Zone 1 again. The diameter of the ring determines the scale of the unit, and the relative arc length of Zones 1-4 to that of the airflow zone equals the ratio of desorption to adsorption times. It is important to emphasize here that the arc of each zone may be modified or eliminated without departing from the scope and spirit of the present invention.

Three Zone Process Design (Steam Purge)

In one embodiment of the current invention, the sorbent regeneration is performed with three zones. This is shown in FIG. 2. A three zone embodiment results in a faster regeneration process with less operating expense than a four zone embodiment. Zone 1 employs a rapid steam sweep to purge the channels of air. This steam sweep is performed with a rapid velocity of steam such that little steam condenses on the interior surface of the monolith so as to not heat the sorbent. Zone 2 will provide steam injection at a controlled rate to heat the sorbent and produce a CO2/Steam mixture. Zone 3 employs a flow of an inert gas such as N2, or a mixture of inert gas and air to a targeted O2 level, through the monolith channel to partially cool it before returning to airflow.

Three Zone Process Design (CO2 Purge)

In another embodiment of the current invention, the sorbent regeneration is performed with three zones. This is shown in FIG. 2. A three zone embodiment results in a faster regeneration process with less operating expense than a four zone embodiment. In one embodiment, Zone 1 employs a CO2 sweep to purge the channels of air. This CO2 sweep is performed with a rapid velocity of CO2 such that little additional CO2 adsorbs onto the monolith. Zone 2 will provide steam injection at a controlled rate to heat the sorbent and produce a CO2/Steam mixture. Zone 3 employs a flow of an inert gas such as N2, or a mixture of inert gas and air to a targeted reduced O2 level, through the monolith channel to partially cool it before returning to airflow.

Flue Gas Injection Design

In one embodiment of the current invention, a flue gas, or other CO2-enriched gas, is injected at a targeted velocity such as to adsorb additional CO2 from the flue gas onto the monolith, in an adsorption zone immediately preceding the regeneration zones. This is shown in FIG. 18. The velocity and zone size can be altered to optimize the additional adsorption of CO2 such as to prevent CO2 originally in the flue gas from escaping, or breaking through, the back of the monolith; or the velocity and zone size can be altered to maximize the CO2 uptake per unit time. The flue gas can also be used to purge the channels of residual air. The flue gas can provide preheating to the monoliths through its sensible heat, as well as through exothermic adsorption heating, reducing the overall energy requirements. Zone 1 of the regeneration box will provide for further flushing out of the monolith. Zone 2 will provide steam injection at a controlled rate to finish heating the sorbent and produce a CO2/Steam mixture. Zone 3 employs a flow of an inert gas such as N2, or a mixture of inert gas and air to a targeted O2 level, through the monolith channel to partially cool it before returning to airflow.

Center Driven Movement of Monoliths

In one embodiment of the current invention, the monolith wheel is moved through the regeneration zones by mechanical means driven from the center of a circular wheel. This is shown in FIG. 5 and FIG. 6. In this embodiment a central drive powers the movement by arms, or spokes, that reach from the center to the edge of the ring. The monoliths are held in frames that can be moved around the circumference of the track by wheels or another low friction system. The spokes, or arms, attach to the monolith frames at the top or bottom to drive them around the edge of the system and through the air and regeneration zones. One or more mounted fans draw air evenly through the monoliths. Process fluids are delivered to and from the process zones via tubes routed through static piping such as would be found in any process plant.

Edge Drive Movement of Monoliths

In one embodiment of the current invention, the monolith loop is moved through the regeneration zones by mechanical means driven from the edge of a circular wheel or other shaped system. The monoliths are held in frames that can be moved around the circumference of the track on wheels or another low friction support. In this embodiment one or more motors located around the inside or outside edge of the monolith loop engage a fin or other item attached to the monolith panels. The motor can engage the fin by a wheel, gear, or other rotating means. One or more mounted fans draw air evenly through the monoliths. Process fluids are delivered to and from the process zones via tubes routed through the steel arms. The tubes each have rotation joints to permit movement Center Driven Movement of Regeneration Box In one embodiment of the current invention, the regeneration assembly is moved around the monolith loop by mechanical means driven from the center of a circular wheel, as can also be shown by FIGS. 5 and 6, where the mechanical, tube-filled arm moves the regeneration box around the loop of stationary monoliths. In this embodiment a central drive powers the movement by arms, or spokes, that reach from the center to the edge of the ring. The monoliths are held in frames that are static and cannot be moved. The regeneration assembly is mounted such that it can be moved around the track on wheels or another low friction system. The spokes, or arms, attach to the regeneration assembly at the top or bottom to drive it around the edge of the system. One or more mounted fans draw air evenly through the monoliths. Process fluids are delivered to and from the regeneration process zones via tubes routed through the steel arms. The tubes each have rotation joints to permit movement, without leaking fluids.

Edge Drive Movement of Regeneration Box

In one embodiment of the current invention, the regeneration assembly is moved around the monolith loop by mechanical means driven from the edge, or perimeter, of the monolith loop. In this embodiment one or more motors located at the inside or outside edge of the regeneration assembly engage a fin or other item attached to the regeneration assembly. The motor can engage the fin by a wheel, gear, or other rotating means. The monoliths are held in frames that are static and cannot be moved. The regeneration assembly is mounted such that it can be moved around the track on wheels or another low friction system. One or more mounted fans draw air evenly through the monoliths. Process fluids are delivered to and from the process zones via tubes routed through the steel arms. The tubes each have rotation joints to permit movement.

Top Mounted Fan Arrangement

In one embodiment of the current invention, fans are mounted around the perimeter of the monolith ring with their blades oriented parallel to the ground. This is shown in FIG. 7, FIG. 10 and FIG. 11. This arrangement, referred to as 'top mounting', mimics conventional cooling towers. The fans are arranged relative to the monolith loop such as to induce airflow through the monoliths rather than force airflow through the monoliths. In this embodiment, air is ejected upwards away from the plant after it passes through the monolith and fan area. In this embodiment, either the monoliths or the regeneration box can be the moving component of the plant. In this embodiment, the fan speeds and size can be optimized, adjusted, changed, or different from one another at different positions along the monolith loop to optimize performance and energy use of the DAC process.

Side Exterior Mounted Fan Arrangement

In one embodiment of the current invention, fans are mounted around the perimeter of the monolith ring with their blades oriented perpendicular to the ground and are positioned on the exterior of the monolith loop. This is shown in FIG. 9. This arrangement is referred to as 'side exterior mounting'. The fans induce airflow from interior to exterior of the monolith loop, across the monolith. In this embodiment, air is ejected outwards after it passes through the monolith and fan area. In this embodiment, either the monoliths or the regeneration box can be the moving component of the plant. In this embodiment, the fan speeds and size can be optimized, adjusted, changed, or different from one another at different positions along the monolith loop to optimize performance and energy use of the DAC process.

Side Interior Mounted Fan Arrangement

In one embodiment of the current invention, fans are mounted around the perimeter of the monolith ring with their blades oriented perpendicular to the ground and are positioned on the interior of the monolith loop. This is shown in FIG. 8. This arrangement is referred to as 'side interior mounting'. The fans induce airflow from exterior to interior of the monolith loop, across the monolith. In this embodiment, air is ejected inwards after it passes through the monolith and fan area. In this embodiment, either the monoliths or the regeneration box can be the moving component of the plant. In this embodiment, the fan speeds and size can be optimized, adjusted, changed, or different from one another at different positions along the monolith loop to optimize performance and energy use of the DAC process.

Non-Circular Track

In one embodiment of the current invention the monolith loop is non-circular. This is shown in FIG. 19. The monolith loop can be any shape with smooth corners and a radius of curvature such as to facilitate smooth continuous movement of either the regeneration assembly or the monolith loop to deliver process conditions to each of the monoliths in order. The monolith loop shape can be symmetric or non-symmetrically shaped. It can be regular or irregularly shaped.

Multiple Regeneration Box Single Ring Arrangement

In one embodiment of the current invention, there are multiple regeneration assembly areas on a single monolith loop. This is shown in FIG. 17. Monolith loops that are very large can be equipped with any number of regeneration areas, such that the ratio of total regeneration area to non-regeneration area is the same as an embodiment with only a single regeneration area. In this way, the monolith loop relative speed, whether moving the regeneration box or the monoliths can be controlled to a slow, safe, and efficient rate while the total output of the plant can increase. Further, process fluids can be shared between regeneration areas to reduce the total cost of the plant.

Concentric Ring Arrangement

In one embodiment of the current invention, multiple monolith loops can be placed concentrically within one and other. This is shown in FIG. 16. In this embodiment, the amount of CO2 produced from a given area of land can be increased by avoiding large open spaces in the middle of a loop of monolith loop.

Foam Roller Seal Regeneration Box

In one embodiment of the current invention, the zones in the regeneration box are created by direct contact roller seals that sealingly separate the zones from one another, and from the exterior of the regeneration assembly. These seals are shown schematically in FIG. 3 and FIG. 4, and in detail in FIG. 12 and FIG. 13. In this embodiment, roller seals roll against the monolith face on both the gas inlet and outlet sides of the monolith. The roller seals compress slightly against the face of the monolith and rotate as the monolith passes through it to maintain contact. A full seal is formed by means of a wiper seal that contacts the roller seal in a position opposite where the roller seal contacts the monolith.

The seal is comprised of a solid tube that has a layer of soft material adhered to the exterior surface. The soft material can be a foam material. The soft material should compress against the face of the monolith by $1/16"$ to $1"$ to form the seal. The foam material can be made of silicone, EPDM, or another rubber material. The foam material can be open cell or closed cell but is preferably closed cell. The foam material can have a void fraction of between.

Labyrinth Seal Regeneration Box

In one embodiment of the current invention, the zones in the regeneration box are created by non-contact labyrinth seals that separate the fluids from the process zones from one and other. This is shown in FIG. 14 and FIG. 15. These can also be used to seal the edges of the regeneration assembly from the air flow area. These labyrinth seals do not contact the face of the monolith, but rather create a very small gap between their tip and the monolith face. The labyrinth seals can be spaced from between $1/32"$ to $1/2"$ away from the monolith face to create a zone seal. Multiple labyrinth seals can also be used to create a single seal. A single labyrinth seal, or a set of labyrinth seals are placed on both sides of the monolith face to form one side of a seal. Further, two labyrinth seals placed close together on both sides of the monolith with a pressurized fluid running between them can form a blanketed labyrinth seal that adds additional sealing capacity to the regeneration zones.

An existing need that is satisfied by the present invention includes overcoming technical challenges associated with known direct air capture (DAC) processes. Such challenges include providing a system having the ability to process enormous volumetric flowrates of carbon dioxide-laden air, performing regeneration at low cost, and reducing overall capital costs to deliver these conditions. Further, costs can be exacerbated by relatively low reliability factors of some previous inventions. This currently unfulfilled need has created an opportunity seized by the inventors of the present invention for improving overall capture costs-especially capital costs and overall reliability.

As discussed above, a primary object of the present invention is to provide a continuous motion, as opposed to being operated in a discrete batchwise fashion, direct air capture system that will capture CO2 from the air and produce a >95% purity CO2 product. The system of the present invention will result in decreased costs of DAC.

This invention seeks to advance DAC technology to a level not previously attained. Not only will this invention significantly advance the state of the art of DAC technology, but it will also significantly reduce the cost per ton of carbon dioxide captured and, optionally, being capable of sequestration.

Among the inventions disclosed herein, the present invention teaches a novel combination of inventive concepts, including a system, apparatus and methods of capturing carbon dioxide from ambient air as well as mixtures of gases, some of which include but are not limited to ambient air. In one embodiment of the present invention disclosed herein, carbon dioxide is captured using a rotating system, described in more detail above. In another embodiment of the invention, carbon dioxide is removed from a stream of gas that includes ambient air, combined flue gas from a fossil fuel combustion source.

In the past, it was known to use either a single unit containing both a sorption section open to the atmosphere and a regeneration capability utilizing the same unit but having valved conduits capable of switching between the source of ambient air i.e. the atmosphere, and a source of process heat steam, for example. With steam of preferably process heat is generally used in these carbon capture systems at temperatures of not greater than 120° Celsius and preferably below 100°, the operating costs for this system would be lowered.

This patent application provides examples in and of a system for continuously directly capturing carbon dioxide from ambient air and/or gases containing ambient air. Other examples will occur to persons who are skilled in the art, and all of same shall come within the scope of the present invention, as defined by the following claims.

We claim:

1. A system capable of continuously separating carbon dioxide from gases containing carbon dioxide, the system comprising:
   an array of porous monoliths, each monolith supporting a sorbent for carbon dioxide within its pores, the array forming a continuous loop;
   an adsorption assembly in which the array of porous monoliths is exposed to a flow of a gas mixture containing carbon dioxide, wherein the sorbent adsorbs carbon dioxide from the flow of gas mixture; and
   a regeneration assembly capable of containing a portion of the array of porous monoliths, the regeneration assembly comprising a plurality of zones including a first zone for reducing an oxygen level in the portion of the array of porous monoliths contained within the first zone, a second zone for heating the portion of the array of porous monoliths contained within the second zone and releasing the sorbed carbon dioxide, and a third zone for cooling the portion of the array of porous monoliths contained within the third zone, wherein the regeneration assembly is in relative movement with respect to the array of porous monoliths.

2. The system of claim 1, wherein the flow of the gas mixture is induced by at least one fan.

3. The system of claim 2, wherein the at least one fan is oriented perpendicularly to the array of porous monoliths and the at least one fan induces the flow of the gas mixture through the array of porous monoliths and exhausts the flow of the gas mixture upwards.

4. The system of claim 1, wherein each zone is confined between two boundaries and wherein each boundary is created by a seal.

5. The system of claim 4, wherein the seal is comprised of two roller seal assemblies each contacting opposite faces of the array of porous monoliths.

6. The system of claim 4, wherein the seal is comprised of two labyrinth seal assemblies each comprising at least one wiper blade positioned close to opposite faces of the array of porous monoliths.

7. The system of claim 1, wherein gas containing carbon dioxide is injected through the array of porous monoliths contained within the first zone.

8. The system of claim 1, wherein steam is injected through the array of porous monoliths contained within the second zone and the released carbon dioxide is collected.

9. The system of claim 1, wherein gas is injected through the array of porous monoliths contained within the third zone.

10. The system of claim 1, wherein the plurality of zones includes a fourth zone for increasing purity of the released carbon dioxide.

11. The system of claim 10, wherein increasing the purity of the released carbon dioxide is done by injecting steam through the portion of the array of porous monoliths contained within the fourth zone.

12. The system of claim 1, wherein the regeneration assembly moves around the array of porous monoliths which is stationary.

13. The system of claim 1, wherein the array of porous monoliths moves through the regeneration assembly which is stationary.

14. The system of claim 1, wherein the gas mixture containing carbon dioxide is ambient air.

15. The system of claim 1, wherein a portion of the gas mixture containing carbon dioxide is flue gas.

16. A method for continuously separating carbon dioxide from a mixture of gases containing carbon dioxide, the method comprising:
flowing, at an adsorption assembly, the mixture of gases containing carbon dioxide through a portion of an array of porous monoliths, each monolith supporting a sorbent for carbon dioxide within its pores, thereby enabling the sorbent to sorb carbon dioxide from the flow of the mixture of gases;
containing a portion of the array of porous monoliths within a regeneration assembly sealed from the flowing mixture of gases, wherein the contained portion of the array of porous monoliths in the regeneration assembly is sequentially exposed to a plurality of zones, including a first zone for reducing an oxygen level in the portion of the array of porous monoliths contained within the first zone, a second zone for heating the portion of the array of porous monoliths contained within the second zone to release and collect the sorbed carbon dioxide, and a third zone for cooling the portion of the array of porous monoliths contained within the third zone; and
returning the contained portion of the array of porous monoliths to the adsorption assembly via relative movement between the array of porous monoliths and the regeneration assembly, thereby enabling further sorbing of carbon dioxide onto the portion of the array of porous monoliths.

17. The method of claim 16, wherein the flow of the mixture of gases approaches the array of porous monoliths at a velocity between 1-10 m/s.

18. The method of claim 16, wherein gas containing carbon dioxide is injected through the portion of the array of porous monoliths contained within the first zone, wherein steam is injected through the portion of the array of porous monoliths contained within the second zone for heating the array to release and collect the sorbed carbon dioxide, and wherein gas is injected through the portion of the array of porous monoliths contained within the third zone.

19. The method of claim 16, wherein the plurality of zones includes a fourth zone for increasing purity of the collected carbon dioxide.

* * * * *